(12) United States Patent
Nikitenko et al.

(10) Patent No.: US 10,495,780 B2
(45) Date of Patent: Dec. 3, 2019

(54) CORRECTING SHALE VOLUME AND MEASURING ANISOTROPY IN INVADED ZONE

(71) Applicant: BAKER HUGHES INCORPORATED, Houston, TX (US)

(72) Inventors: Marina N. Nikitenko, Novosibirsk (RU); Leonty Tabarovsky, Cypress, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 379 days.

(21) Appl. No.: 15/311,430

(22) PCT Filed: Sep. 28, 2015

(86) PCT No.: PCT/RU2015/000621
§ 371 (c)(1),
(2) Date: Nov. 15, 2016

(87) PCT Pub. No.: WO2017/058043
PCT Pub. Date: Apr. 6, 2017

(65) Prior Publication Data
US 2017/0254924 A1    Sep. 7, 2017

(51) Int. Cl.
*G01V 1/40*        (2006.01)
*G01V 11/00*       (2006.01)
(Continued)

(52) U.S. Cl.
CPC .............. *G01V 11/002* (2013.01); *G01V 3/28* (2013.01); *G01V 3/38* (2013.01); *G01V 5/12* (2013.01); *G01V 11/00* (2013.01)

(58) Field of Classification Search
None
See application file for complete search history.

(56) References Cited

U.S. PATENT DOCUMENTS 6,376,838 B1   4/2002  Odom
6,686,736 B2   2/2004  Schoen et al.
(Continued)

OTHER PUBLICATIONS

Zhang, Zhiyi, et al., "Petrophysically Constrained Inversion of Resistivity Logging Data," Petrophysics vol. 43, No. 2, pp. 82-91 (2002).

(Continued)

*Primary Examiner* — Aditya S Bhat
(74) *Attorney, Agent, or Firm* — Mossman, Kumar & Tyler, PC

(57) ABSTRACT

This disclosure describes a method, apparatus, and non-transitory computer-readable medium product for correcting a shale volume estimated from gamma ray information using a continuous radial profile of horizontal resistivity in the invaded zone and a continuous profile of anisotropy. The continuous radial profile of horizontal resistivity may be estimated by modeling a hydrodynamic evolution of the invaded zone (a) a step-wise radial profile of horizontal resistivity in the invaded zone as an initial estimate of horizontal resistivity in the invaded zone; (b) an estimated shallow resistivity at a borehole wall; and (c) an estimated horizontal conductance of the formation at an outer boundary of the borehole wall estimated from multi-component induction logging information. The shale volume may be corrected if at least one of (a) an estimated horizontal resistivity of the borehole wall and (b) an estimated horizontal resistivity of the earth formation is not between about a minimum horizontal resistivity and about a maximum horizontal resistivity estimated using the anisotropy.

19 Claims, 11 Drawing Sheets

(51) Int. Cl.
*G01V 3/28* (2006.01)
*G01V 3/38* (2006.01)
*G01V 5/12* (2006.01)

(56) References Cited

U.S. PATENT DOCUMENTS

| | | | |
|---|---|---|---|
| 6,925,384 | B2 | 8/2005 | Frenkel et al. |
| 7,567,869 | B2 | 7/2009 | Nikitenko et al. |
| 8,049,507 | B2 | 11/2011 | Rabinovich et al. |
| 8,473,213 | B2 | 6/2013 | Zhu et al. |
| 8,792,302 | B2 | 7/2014 | Bachrach |
| 2002/0101235 | A1 | 8/2002 | Schoen et al. |
| 2003/0105590 | A1 | 6/2003 | Mollison et al. |
| 2005/0065730 | A1* | 3/2005 | Sinha .................. G01V 1/50 702/7 |
| 2005/0114029 | A1* | 5/2005 | Clavaud .............. G01V 1/50 702/7 |
| 2006/0085135 | A1* | 4/2006 | Clavaud .............. E21B 49/00 702/12 |

OTHER PUBLICATIONS

Wang, H. et al., Determining Anisotropic Formation Resistivity at Any Relative Dip Using a Multiarray Triaxial Induction Tool, SPE 103113, 13 pp. (2006).

Gladkikh, Mikhail et al., "Combining the Prediction of Penetration Depth of Downhole Perforators with the Depth of Invasion," SPE 122319, 10 pp. (2009).

Donderici, Burkay, et al., "Limitations of Resistivity Anisotropy Inversion in LWD Applications," SPWLA 54th Annual Logging Symposium, pp. 1-16 (2013).

Clavaud, Jean Baptiste et al., "Field Example of Enhanced Hydrocarbon Estimation in Thinly Laminated Formation With a Triaxial Array Induction Tool: A Laminated Sand-Shale Analysis With Anisotropic Shale," SPWLA 46th Annual Logging Symposium, Jun. 29, 2005, XP055210717, the whole document.

Mezzatesta, A. G. et al., "Laminated Shaly Sand Reservoirs—An Interpretation Model Incorporating New Measurements," SPWLA 43rd Annual Logging Symposium, Jun. 5, 2001, pp. 1-12, XP055092848, the whole document.

* cited by examiner

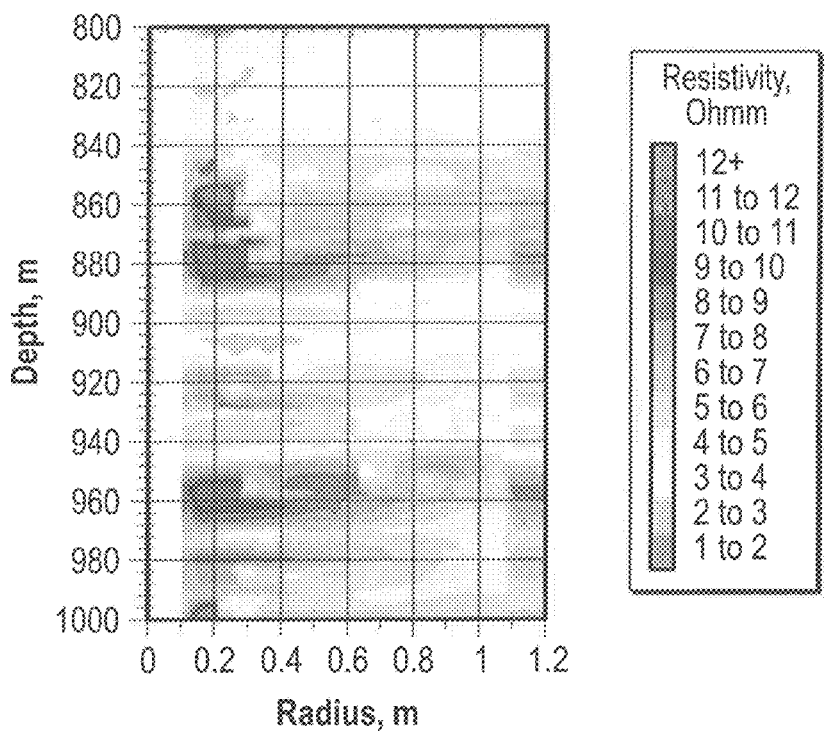
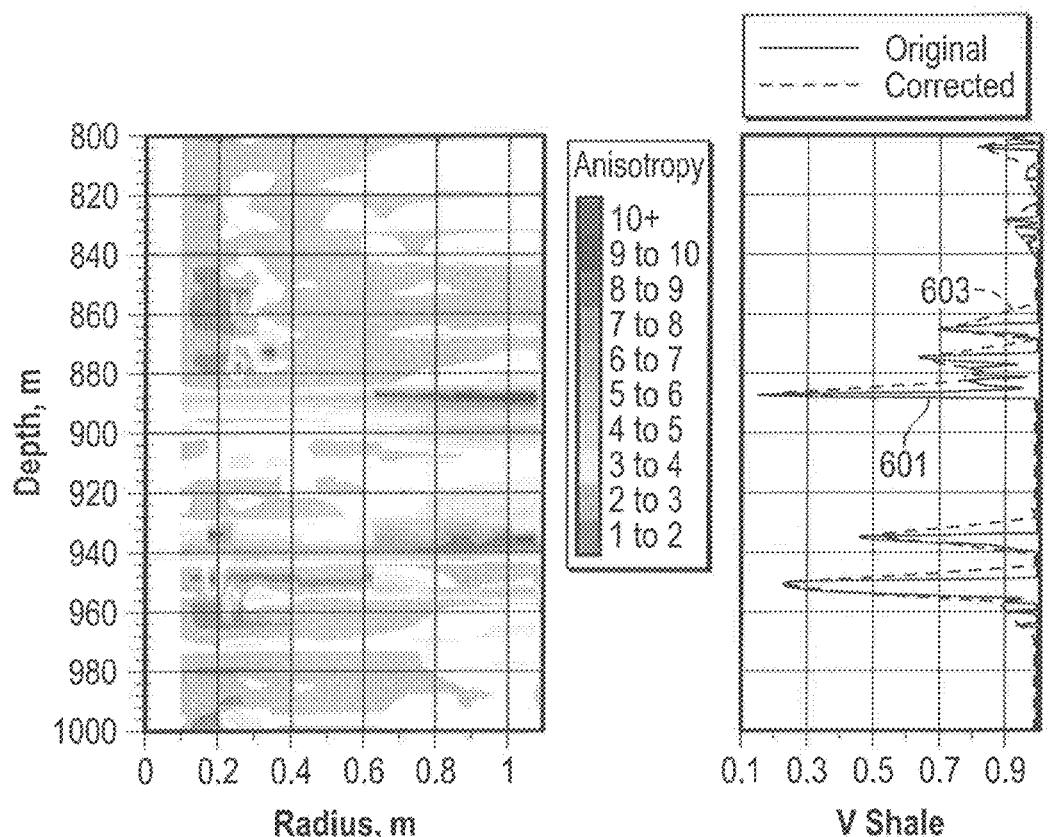
FIG. 6A
FIG. 6B
FIG. 6C

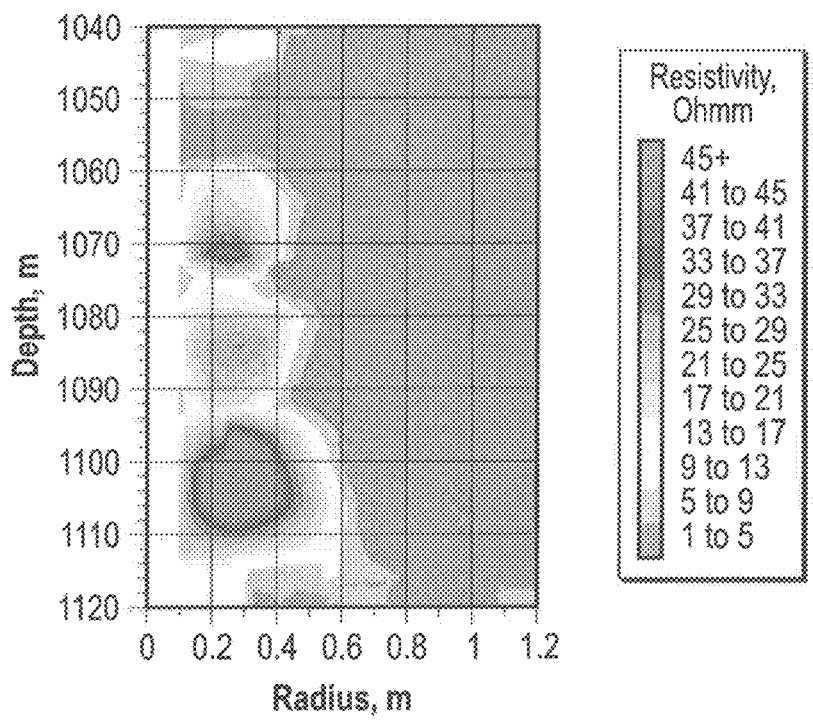
FIG. 7A
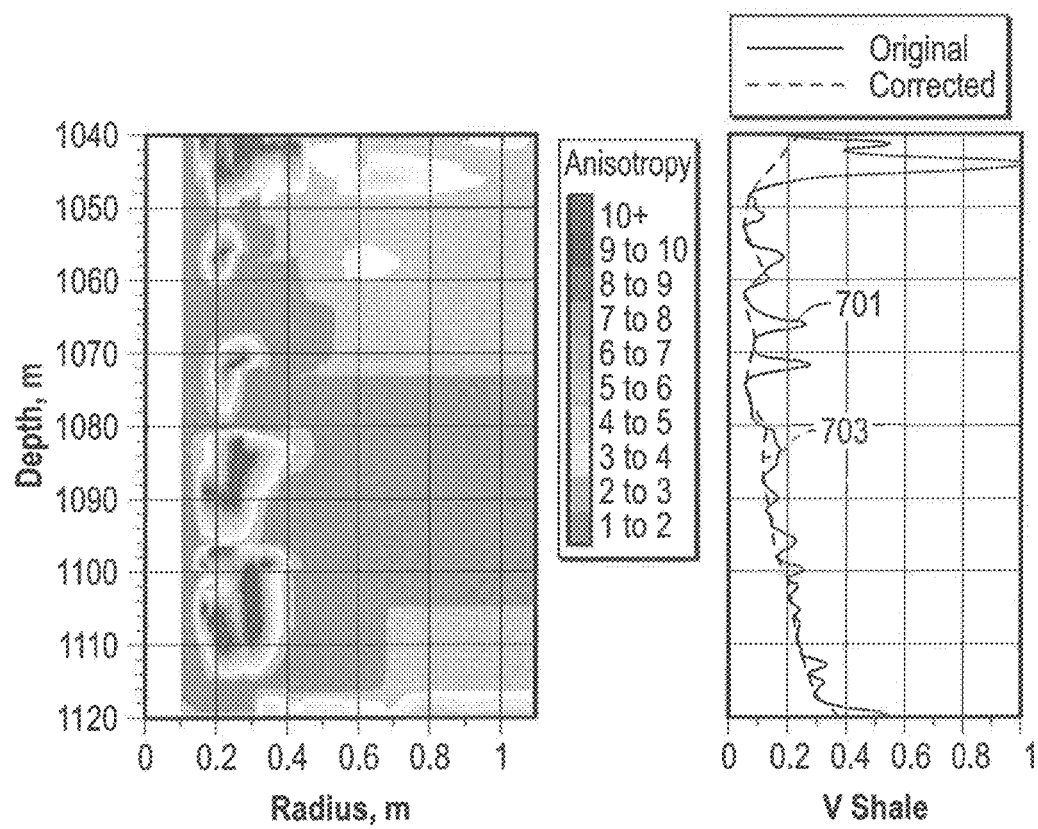
FIG. 7B
FIG. 7C

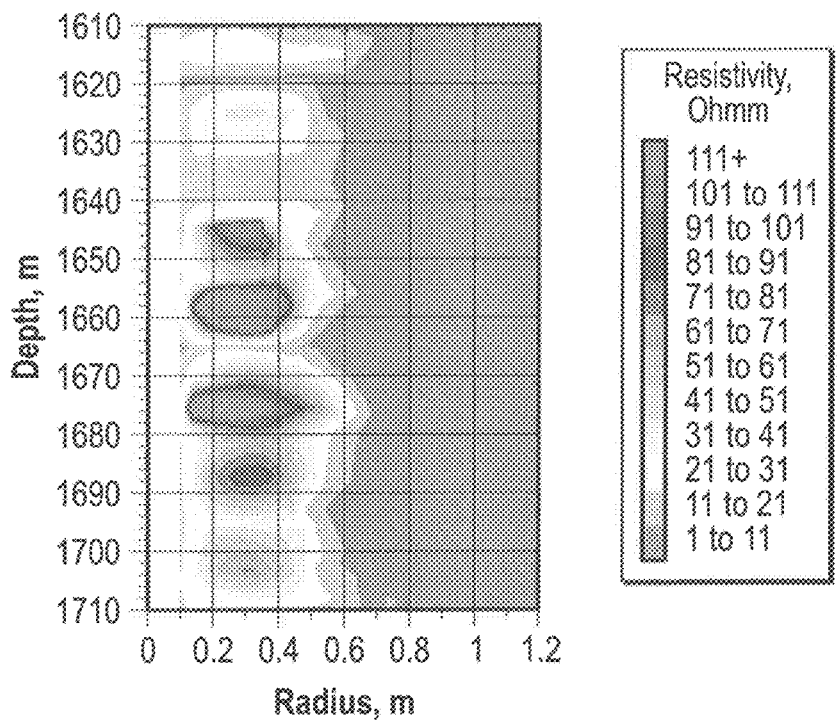
FIG. 8A
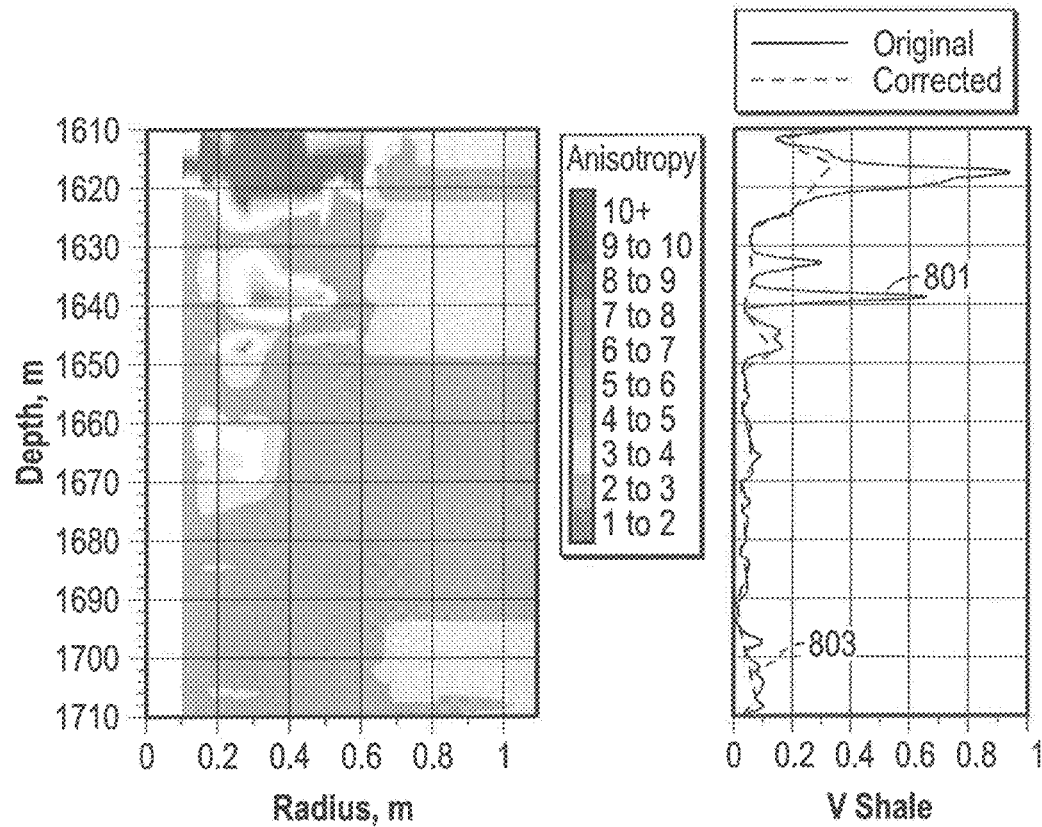
FIG. 8B
FIG. 8C

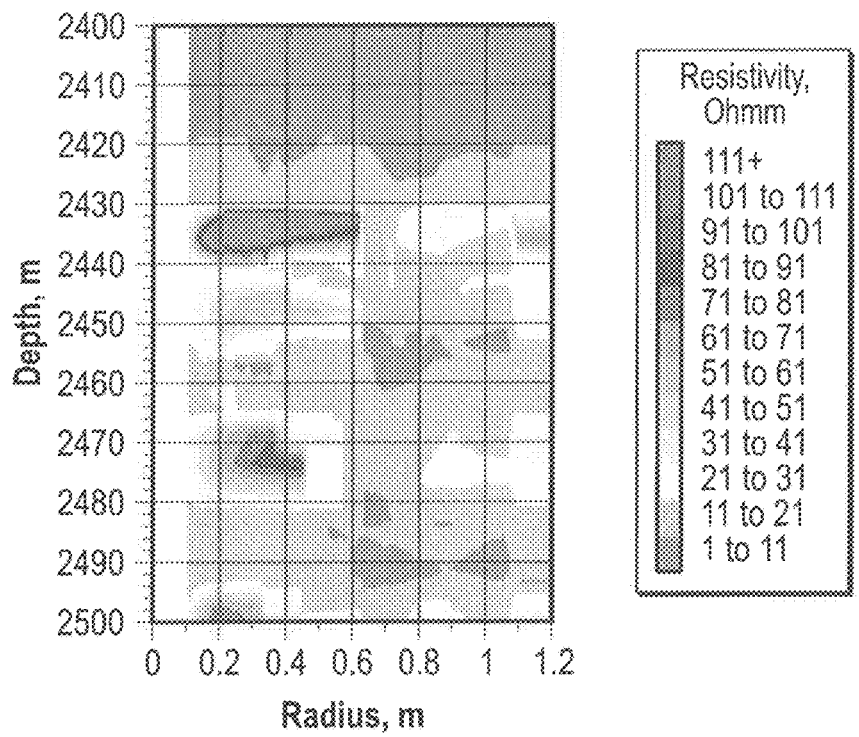
FIG. 9A
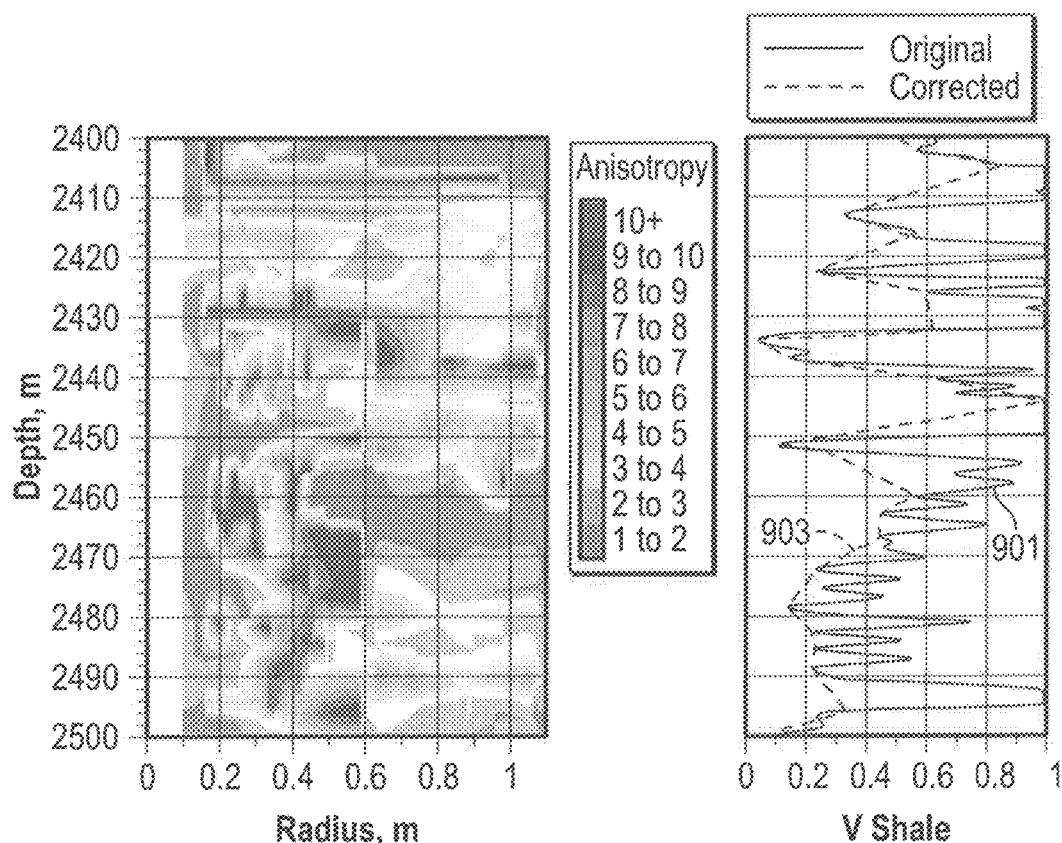
FIG. 9B
FIG. 9C

CORRECTING SHALE VOLUME AND MEASURING ANISOTROPY IN INVADED ZONE

FIELD OF THE DISCLOSURE

This disclosure generally relates to exploration for hydrocarbons involving investigations of an earth formation surrounding a borehole. More specifically, this disclosure relates to calculating a continuous radial profile of anisotropy estimated from recovered invaded zone resistivities and correcting an estimate for shale volume from gamma ray information.

BACKGROUND OF THE DISCLOSURE

In petroleum exploration, various parameters of an earth formation may be measured to estimate a presence of hydrocarbon, such as oil or gas. Electrical earth borehole logging is well known and various devices and techniques have been described for this purpose. Broadly speaking, there are two categories of devices used in electrical logging devices. In the first category, called "galvanic" devices, electrodes emit current into the earth formations in order to determine resistivity. One of the simplest forms of galvanic devices is the so-called "normal" device where a current electrode emits a current through the earth formation to a remote return location, and a voltage electrode measures the potential due to that current with respect to the remote reference location. In the second category (inductive measuring tools), an antenna within the measuring instrument may induce a current flow within the earth formation. Resistivity can be determined by measuring either the magnitude or the attenuation caused by propagation of this current by same antenna or separate receiver antennas.

Also, identifying the location of shale layers and knowing the proportion of shale in the formation is important for exploring and developing a reservoir. The shale volume may be involved in wellbore stability analysis, rock classification, computation of volumetric composition of the formation, including hydrocarbon saturation and water saturation. Shale volume may be derived from formation investigation logs using measurements involving gamma ray, spontaneous potential, neutron-density combination, and resistivity.

SUMMARY OF THE DISCLOSURE

In aspects, the present disclosure is related to methods and apparatuses for calculating resistivity and anisotropy in invaded zone and correcting a shale volume estimated from gamma ray information using well logging information. The well logging information that may be used includes formation resistivity and anisotropy from multi-component induction tool, borehole wall resistivity from shallow resistivity imager, shale volume from gamma ray information, and multi-array induction tool information, which allows inversion for invaded zone resistivity. One embodiment of this disclosure includes using different measurement tools simultaneously during downhole well logging to improve petrophysical evaluation.

Another embodiment of this disclosure may include a method of estimating a continuous radial profile of horizontal resistivity in the invaded zone of the formation. The horizontal resistivity may be estimated based on an inversion of multi-array induction logging tool data and shallow resistivity measurements. Another embodiment of this disclosure may include a method of estimating a continuous radial profile of anisotropy in the invaded zone using horizontal resistivity in invaded zone, formation anisotropy, and shale volume. Another embodiment of this disclosure may include correcting an estimate of shale volume using resistivity information of the borehole wall and undisturbed zone and introducing substantiated constraints on resistivity and anisotropy in invaded zone.

One example of an embodiment of this disclosure may include a method of estimating a parameter of interest of an earth formation, comprising: estimating a continuous radial profile of anisotropy of an invaded zone of the earth formation using an estimated continuous radial profile of horizontal resistivity in the invaded zone, an estimated shale volume, and an estimated continuous radial profile of vertical resistivity in the invaded zone; and using at least one processor to estimate the parameter of interest by using the estimated continuous radial profile of anisotropy of the invaded zone of the earth formation.

The continuous radial profile of horizontal resistivity in the invaded zone may be estimated by modeling a hydrodynamic evolution of the invaded zone using (a) a step-wise radial profile of horizontal resistivity in the invaded zone as an initial estimate of horizontal resistivity in the invaded zone; (b) an estimated shallow resistivity at a borehole wall; (c) an estimated horizontal and vertical conductance of the formation at an outer boundary of the invaded zone estimated from multi-component induction logging information. The step-wise radial profile of horizontal resistivity may be estimated using an inversion of induction logging information based on a cylindrical model of the earth formation.

The estimated shale volume may be estimated using gamma ray information; the shallow resistivity at the borehole wall is estimated using shallow resistivity logging information; and the estimated vertical resistivity may be estimated using multi-component induction logging information; the continuous radial profile of anisotropy may be further estimated using an estimated resistivity of shale; and the estimated resistivity of shale may be estimated using multi-component induction logging information and the estimated shale volume. The earth formation under investigation may include thinly laminated layers of an impermeable formation (e.g., shale) and a permeable formation (e.g., sand or sandstone).

The parameter of interest may include one of (i) shale volume of the formation, (ii) salinity of the formation, (iii) porosity of the formation, and (iv) permeability of the formation. If the parameter of interest includes shale volume of the formation, the parameter of interest may be further estimated by: estimating a shale resistivity; estimating a minimum horizontal resistivity and a maximum horizontal resistivity using a maximum anisotropy based on the estimated anisotropy; and correcting the estimated shale volume if at least one of (a) an estimated horizontal resistivity of the borehole wall and (b) an estimated horizontal resistivity of the earth formation is not between about the minimum horizontal resistivity and about the maximum horizontal resistivity.

Another example of an embodiment of this disclosure may include an apparatus for estimating a parameter of interest of an earth formation, comprising: an instrument disposed on a carrier, wherein the instrument comprises: a radiation source; a first gamma ray detector; at least one second gamma ray detector; at least one transmitter configured to induce electromagnetic signals in the earth formation; at least one receiver configured to be responsive to the electromagnetic signals induced in the earth formation by the at least one transmitter; and at least one processor configured to: estimate a continuous radial profile anisotropy of an invaded zone of the earth formation using an estimated continuous radial profile of horizontal resistivity in the invaded zone, an estimated shale volume, and an estimated continuous radial profile of vertical resistivity in the invaded zone; and estimate the parameter of interest by using the estimated anisotropy of the invaded zone of the earth formation.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIG. 6A shows a contour plot of the horizontal resistivity in accordance with embodiments of the present disclosure;

FIG. 6B shows a contour plot of the invaded zone anisotropy in accordance with embodiments of the present disclosure;

FIG. 6C shows a chart of the shale volume in accordance with embodiments of the present disclosure;

FIG. 7A shows a contour plot of the horizontal resistivity in accordance with embodiments of the present disclosure;

FIG. 7B shows a contour plot of the invaded zone anisotropy in accordance with embodiments of the present disclosure;

FIG. 7C shows a chart of the shale volume in accordance with embodiments of the present disclosure;

FIG. 8A shows a contour plot of the horizontal resistivity in accordance with embodiments of the present disclosure;

FIG. 8B shows a contour plot of the invaded zone anisotropy in accordance with embodiments of the present disclosure;

FIG. 8C shows a chart of the shale volume in accordance with embodiments of the present disclosure;

FIG. 9A shows a contour plot of the horizontal resistivity in accordance with embodiments of the present disclosure;

FIG. 9B shows a contour plot of the invaded zone anisotropy in accordance with embodiments of the present disclosure;

FIG. 9C shows a chart of the shale volume in accordance with embodiments of the present disclosure;

DETAILED DESCRIPTION

Figure 1:
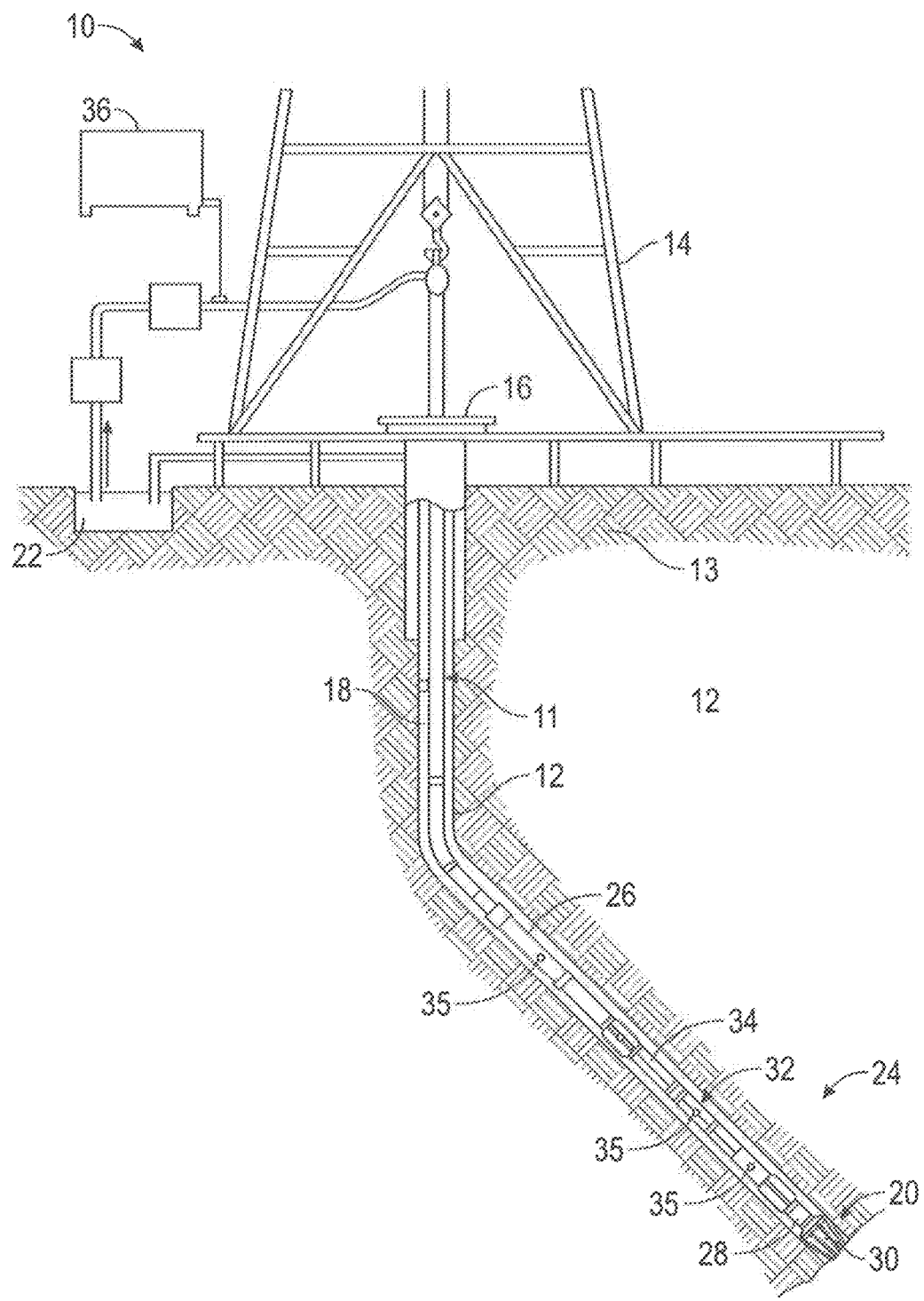
FIG. 1 shows a schematic of a borehole including a downhole tool for estimating a parameter of interest of an earth formation according to embodiments of the present disclosure.

This disclosure generally relates to exploration for hydrocarbons involving nuclear and electromagnetic investigations of an earth formation intersected by a borehole. These investigations may include estimating a shale volume of the earth formation and estimating a continuous radial profile of horizontal resistivity and anisotropy in the invaded zone of a permeable formation.

The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein. Indeed, as will become apparent, the teachings of the present disclosure can be utilized for a variety of well tools and in all phases of well construction and production. Accordingly, the embodiments discussed below are merely illustrative of the applications of the present disclosure.

Shale content predictions derived from gamma ray information may be influenced by radioactive formations, radioactive noise from the tool body, or the radiation source, yielding an overestimation in shale volume. To counter these shortcomings of shale volume predictions from gamma ray logs, the shale volume may be corrected using a shallow resistivity at a borehole wall, horizontal and vertical resistivities, and a maximum anisotropy.

Multi-component induction logging tools may be used to investigate the formation resistivity (i.e., the uninvaded zone) and anisotropy. Other electromagnetic tools, such as a multi-array induction logging tool, may be used to investigate resistive properties of the invaded zone and virgin formation. Also, electromagnetic imagers may provide a shallow resistivity near the borehole wall. However, the multi-array induction logging tools provide properties of the invaded zone that are estimated at only one or two radial depths from the borehole wall. That is, these EM tools estimate an invasion profile in discrete radial intervals. These resistivity images lack radial resolution of the resistivity in the invaded zone. Also, these resistivities of the invaded zone have not been combined with the multi-component induction logging tool information and a shallow resistivity to recover a continuous radial profile of horizontal resistivity and anisotropy in the invaded zone, yielding continuous radial profiles from the borehole to an outer boundary in the virgin formation.

FIG. 1 shows an exemplary embodiment of a well drilling, logging and/or geosteering system 10 includes a drillstring 11 that is shown disposed in a wellbore or borehole 12 that penetrates at least one earth formation 13 during a drilling operation and makes measurements of properties of the formation 13 and/or the borehole 12 downhole. As described herein, "borehole" or "wellbore" refers to a single hole that makes up all or part of a drilled well. As described herein, "formations" refer to the various features and materials that may be encountered in a subsurface environment and surround the borehole. The term "information" includes, but is not limited to, raw data, processed data, and signals.

In one embodiment, the system 10 includes a conventional derrick 14 that may supports a rotary table 16 that is rotated at a desired rotational speed. The drillstring 11 includes one or more drill pipe sections 18 that extend downward into the borehole 12 from the rotary table 16, and is connected to a drilling assembly 20. Drilling fluid or drilling mud 22 is pumped through the drillstring 11 and/or the borehole 12. The well drilling system 10 also includes a bottomhole assembly (BHA) 24. In one embodiment, a drill motor or mud motor 26 is coupled to the drilling assembly 20 and rotates the drilling assembly 20 when the drilling fluid 22 is passed through the mud motor 26 under pressure.

In one embodiment, the drilling assembly 20 includes a steering assembly including a shaft 28 connected to a drill bit 30. The shaft 28, which in one embodiment is coupled to the mud motor, is utilized in geosteering operations to steer the drill bit 30 and the drillstring 11 through the formation.

In one embodiment, the drilling assembly 20 is included in the bottomhole assembly (BHA) 24, which is disposable within the system 10 at or near the downhole portion of the drillstring 11. The system 10 includes any number of downhole tools 32 for various processes including formation drilling, geosteering, and formation evaluation (FE) for measuring versus depth and/or time one or more physical quantities in or around a borehole. The tool 32 may be included in or embodied as a BHA, drillstring component or other suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tubing type, of the jointed pipe type and any combination or portion thereof. Other carriers include, but are not limited to, casing pipes, wirelines, wireline sondes, slickline sondes, drop shots, downhole subs, bottom-hole assemblies, and drill strings.

In one embodiment, one or more downhole components, such as the drillstring 11, the downhole tool 32, the drilling assembly 20 and the drill bit 30, include sensor devices 34 configured to measure various parameters of the formation and/or borehole. For example, one or more parameter sensors 34 (or sensor assemblies such as MWD subs) are configured for formation evaluation measurements and/or other parameters of interest (referred to herein as "evaluation parameters") relating to the formation, borehole, geophysical characteristics, borehole fluids and boundary conditions. These sensors 34 may include formation evaluation sensors (e.g., resistivity, dielectric constant, water saturation, porosity, density, permeability, anisotropy, or shale volume), sensors for measuring borehole parameters (e.g., borehole size, borehole inclination and azimuth, and borehole roughness), sensors for measuring geophysical parameters (e.g., acoustic velocity, acoustic travel time, electrical resistivity), sensors for measuring borehole fluid parameters (e.g., viscosity, density, clarity, rheology, pH level, and gas, oil and water contents), boundary condition sensors, and sensors for measuring physical and chemical properties of the borehole fluid. The system 10 may also include sensors 35 for measuring force, operational and/or environmental parameters related to bending or other static and/or dynamic deformation of one or more downhole components.

Figure 2A:
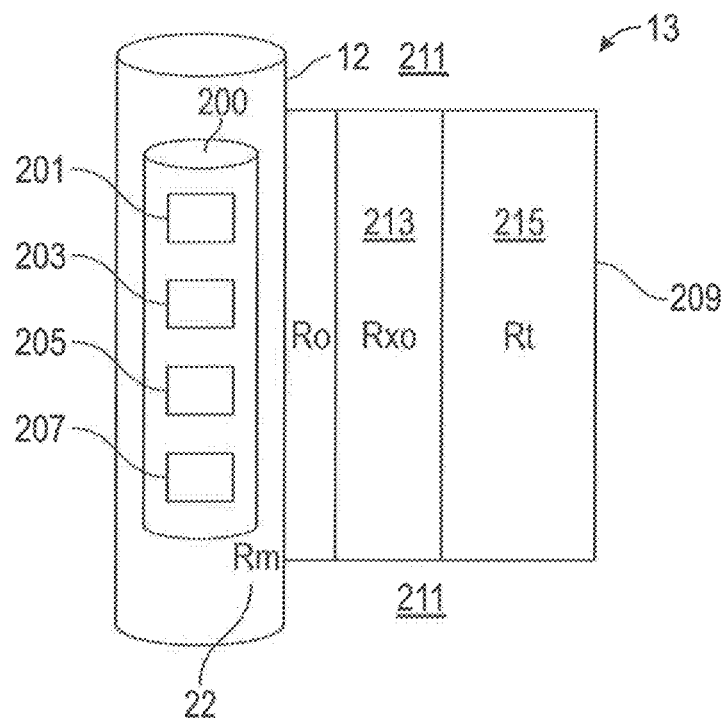
FIG. 2A shows a schematic of a downhole logging tool intersecting an invaded zone in accordance with embodiments of the present disclosure.

FIG. 2A shows a downhole logging tool (logging tool, anisotropy tool, or tool) 200 for evaluating an earth formation according to embodiments of the present disclosure. Downhole logging tool 200 may be incorporated in BHA 24 or downhole tool 32, such as sensor devices 34 according to one embodiment of the present disclosure. A carrier (not shown), which may be rigid or non-rigid, may be configured to convey the downhole logging tool 200 into wellbore 12 in proximity to formation 13. The carrier may be drill string 11, BHA 24, downhole tool 32, coiled tubing, a slickline, an e-line, a wireline, etc. Earth formation 13 may comprise laminated layers, sheet, plates, or veins of permeable formation 209 (e.g., sand) and impermeable formation 211 (e.g., shale). These laminated layers 209, 211 may be thinly laminated, i.e. having a thickness up to about 10 m.

Downhole tool 200 may include one or more formation evaluation modules comprising nuclear detection module 201 (depicted in FIG. 2B), multi-component induction logging module 203 (depicted in FIG. 2C), multi-array induction logging module 205, and shallow resistivity module 207. The formation evaluation modules may be configured to investigate various parameters of interest of the formation, such as shale volume, mud resistivity Rm, shallow formation resistivity Ro (i.e., near the borehole wall 12), invaded zone resistivity Rxo, and the formation resistivity Rt (i.e., uninvaded zone, undisturbed zone, or virgin formation). Downhole tool 200 or formation evaluation modules 201, 203, 205, 207 may be coupled, combined, or in communication with additional tools, such as information processing system 1100 of FIG. 11 or sensors 34, 35.

During drilling operations, the drilling mud 22 may displace some or all of the moveable fluids in a permeable earth formation 209, such as a sandy formation, leaving an invaded zone 213. The invaded zone 213 is a volume in which an appreciable amount of mud filtrate has penetrated the permeable formation 209. The invaded zone 213 may include a flushed zone and a transition zone (not shown). The flushed zone is the volume closest to the borehole wall 12 where the maximum amount of displacement or flushing has occurred. The transition zone is an annulus between the flushed zone and the virgin earth formation (i.e., uninvaded zone or undisturbed zone) 215. This invasion profile provides important information for correcting the shale volume, e.g., estimating the resistivity and anisotropy of the invaded zone.

Figure 2B:
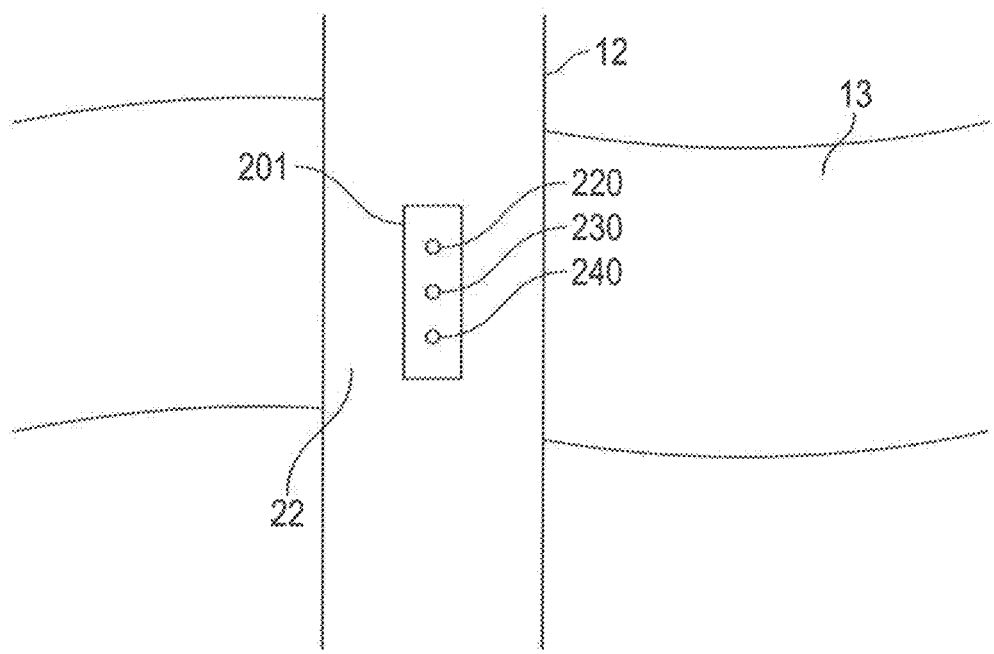
FIG. 2B shows a schematic of a nuclear detection module in accordance with embodiments of the present disclosure.

FIG. 2B shows nuclear detection module (nuclear tool) 201 that may be incorporated in BHA 24, downhole tool 200, or downhole tool 32, such as sensor devices 34, according to one embodiment of the present disclosure. A carrier, which may be rigid or non-rigid, may be configured to convey module 201 into wellbore 12 in proximity to formation 13. The carrier may be drill string 11, BHA 24, downhole tool 32, downhole tool 200, coiled tubing, a slickline, an e-line, a wireline, etc. Nuclear detection module 201 may be coupled, combined, or in communication with additional tools (e.g., downhole tools 32, 200; modules 203, 205, 207; sensors 34, 35; or information processing system of FIG. 11).

Nuclear detection module 201 may be configured to acquire information for estimating shale volume or another parameter of interest of formation 13. In one illustrative embodiment, the nuclear tool 201 may contain a radiation source 240 and associated detectors (gamma ray detectors) 220, 230. The radiation source 240 emits radiation into the formation to be surveyed. This radiation interacts with the nuclei of the atoms of the material of the formation resulting in inelastic gamma rays, capture gamma rays, Compton scattered photons, and pair production photons. In one embodiment, the nuclear detection module 201 may use a pulsed neutron generator emitting 14.2 MeV fast neutrons as its radiation source 240. The use of 14.2 MeV neutrons from a pulsed neutron source is illustrative and exemplary only, as different energy levels of neutrons may be used. In some embodiments, radiation source 240 may use X-rays. In some embodiments, the radiation source 240 may be continuous.

In some embodiments, the radiation source 240 may be controllable in that the radiation source may be turned "on" and "off" while in the wellbore, as opposed to a radiation source that is "on" continuously. This type of radiation source may be called "sourceless" since it does not have a continuous radiation source. Due to the intermittent nature of the pulsed neutron radiation source, the inelastic and capture photons created will reach the detectors 220, 230 during overlapping time periods. Inelastic photons are generated predominantly during the pulse, while capture photons are generated during and after the pulse.

The detectors 220, 230 provide signals that may be used to estimate the radiation counts returning from the formation. Generally, detectors 220, 230 are spaced in a substantially linear fashion relative to the radiation source. If two detectors are used, there may be a short spaced (SS) detector and a long spaced (LS) detector, wherein the detectors have different distances from the radiation source. For instance, in one embodiment, detector 230 may be a short spaced detector, and detector 220 may be a long spaced detector. The SS and LS detectors are not limited to being placed on the same side of the radiation source and their spacing from the radiation source may be equal or unequal since the response of the detectors does not depend on the spatial variation of the gamma ray source within the formation. Additional detectors may be used to provide additional radiation information. Two or more of the detectors may be gamma ray detectors. Some embodiments may include radiation shielding (not shown), which may be located between radiation source 240 and the detectors 220, 230. Radiation shielding may include, but is not limited to, gamma-ray shielding and neutron shielding. Drilling fluid 22 may be present between the formation 13 and the nuclear detection module 201, such that emissions from radiation source 240 may pass through drilling fluid 22 to reach formation 13 and radiation induced in the formation 13 may pass through drilling fluid 22 to reach the detectors 220, 230. The nuclear detection module 201 may be configured to detect gamma radiation counts in the formation indicative of a shale volume.

In one embodiment, electronics (not shown, e.g., information processing system 1100 of FIG. 11) associated with the detectors may be configured to record radiation counts from at least two axially spaced detectors 220, 230 with very narrow time bins or windows (on the order of 1 to 1000 microseconds) and generating a time-dependent ratio between the at least two axially spaced detectors by using information from multiple bursts. This ratio may be expressed as a curve or other graphical function that describes a combination of multiple ratio values. In some embodiments, the parameter of interest may be estimated using a difference between the detector counts. Herein, the term time-dependent broadly describes the property of the ratio to vary with time, as opposed to a ratio that remains constant, such as may occur with a continuous radiation source. In some embodiments, the time-dependent ratio may be weighted. The axially spaced detector count rate ratios may be obtained as a function of time and graphically illustrated as a time-dependent ratio curve. Various properties of the formation may be determined using the time-dependent ratio curve, including, but not limited to, bulk density of the formation, shale volume, or shale index. In other embodiments, such electronics may be located elsewhere (e.g., at the surface).

Figure 2C:
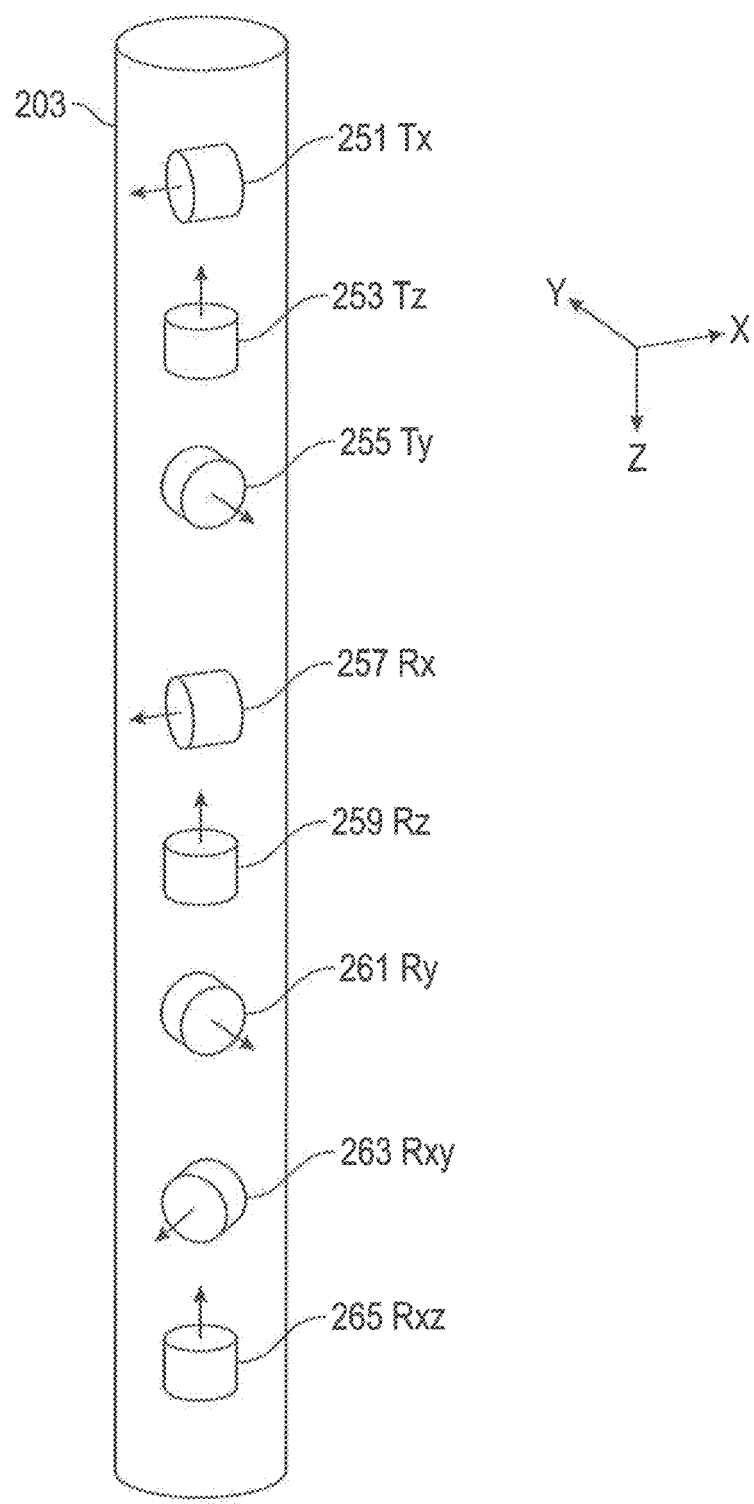
FIG. 2C shows a schematic of a multi-component induction logging module in accordance with embodiments of the present disclosure.

FIG. 2C shows a schematic of multi-component induction logging module (EM instrument, EM tool, 3DEX) 203 including a set of coils in accordance with embodiments of the present disclosure. A carrier, which may be rigid or non-rigid, may be configured to convey module 203 into wellbore 12 in proximity to formation 13. The carrier may be drill string 11, BHA 24, downhole tool 32, downhole tool 200, coiled tubing, a slickline, an e-line, a wireline, etc. Module 203 may be coupled, combined, or in communication with additional tools (e.g., downhole tools 32, 200; modules 203, 205, 207; sensors 34, 35; or information processing system of FIG. 11).

One embodiment of the set of coils includes transmitter coils and receiver coils as shown in FIG. 2C. Three transmitter coils 251, 253 and 255, referred to as the Tx, Tz, and Ty transmitters are substantially orthogonally oriented (the z-axis being along the longitudinal axis of the tool, as depicted in the legend). The transmitter coils 251, 253 and 255 generate magnetic fields for obtaining measurements in the formations 13 surrounding the wellbore 12.

Corresponding to the transmitter coils 251, 253 and 255 are receiver coils 257, 259 and 261, referred to as the Rx, Rz, and Ry receivers, respectively. The receiver coils 257, 259 and 261 measure aspects of the corresponding magnetic fields, and are also substantially orthogonally oriented to each other. Additional receiver coils 263 and 265 may be included and measure two cross-components Hxy, and Hxz of the magnetic field (H) produced by the x-component transmitter. One non-limiting example of the tool 203 is the 3DExplorer™ tool (3DEX), which is an induction logging instrument produced by Baker Hughes, Incorporated of Houston, Tex. Further embodiments of instruments and services may be used, including, for example, instruments using multi-spacing, multi-frequency propagation instruments. Reference may be had to another exemplary instrument, such as that used in support of the AziTrak™ service provided by Baker Hughes Incorporated, and referred to herein as an "azimuthal propagation resistivity tool."

Other embodiments of the EM instrument 203 may include those, for example, with side-by-side transmitter and receiver coils, and those having other arrangements of transmitters and receivers. Varying number of coils may be used. Therefore, it should be recognized that FIG. 2C depicts one embodiment of the well logging instrument 203, and is not limiting thereof. Further, in other embodiments, the additional coils 263, 265 are not included. Further examples include embodiments having transmitter coils and receiver coils with other or varying orientations.

The EM instrument 203 may provide an array of signals that are multiplexed in at least one of a time domain and a frequency domain. That is, a plurality of electromagnetic signals may be issued as a sequence of pulses and/or as a sequence of varying frequencies. As discussed herein, reference to the instrument 203 and aspects thereof generally refer to the exemplary and non-limiting embodiment, the 3DExplorer™ tool (3DEX).

The multi-array induction logging module 205, such as, for example, High-Definition Induction Log (HDIL), may be incorporated in BHA 24, downhole tool 200, or downhole tool 32, such as sensor devices 34, according to one embodiment of the present disclosure. A carrier, which may be rigid or non-rigid, may be configured to convey module 205 into wellbore 12 in proximity to formation 13. The carrier may be drill string 11, BHA 24, downhole tool 32, downhole tool 200, coiled tubing, a slickline, an c-line, a wireline, etc. Module 205 may be coupled, combined, or in communication with additional tools (e.g., downhole tools 200, 32; modules 201, 203, 207; sensors 34, 35; or information processing system of FIG. 11).

Module 205 may include vertical (z-directed) transmitter and receiver array coils (coil centers are in-line with the tool axis). The induced current in near-vertical wells has only a horizontal component, and the induction data contain information related to horizontal resistivity ($R_h$) only. The HDIL may be multi-array induction logging module that collects data at multiple frequencies and various transmitter-receiver spacings. A focusing algorithm converts the HDIL measurements into Vertical Resolution Matched (VRM) logs, which provide estimation of the horizontal resistivity of the formation $R_h$.

The shallow resistivity module (resistivity imager, micro-resistivity imager, or imager) 207 may be incorporated in BHA 24, downhole tool 200, or downhole tool 32, such as sensor devices 34, according to one embodiment of the present disclosure. A carrier, which may be rigid or non-rigid, may be configured to convey module 207 into wellbore 12 in proximity to formation 13. The carrier may be drill string 11, BHA 24, downhole tool 32, downhole tool 200, coiled tubing, a slickline, an e-line, a wireline, etc. Module 207 may be coupled, combined, or in communication with additional tools (e.g., downhole tools 200, 32; modules 201, 203, 205; sensors 34, 35; or information processing system of FIG. 11).

Module 207 may include an array of laterolog electrodes or electrodes disposed on a pad configured to measure a shallow radial depth of investigation of the formation that is near the borehole wall. The shallow resistivity module 207 may have a measure electrode (transmitter) used in conjunction with a diffuse return electrode (receiver), e.g., tool body. The measure electrode may be configured to inject electrical current into the formation. The electric current flows in a circuit that connects a voltage source to the measure electrode, through the earth formation to the return electrode and back to the voltage source in the tool. One or more focusing electrodes (guard electrode) may surround the measure electrode, applying a potential that is substantially the same as the measure electrode to focus the current emitting from the measure electrode into the earth formation. A shallow depth of investigation of the formation is an annulus around the borehole wall having a radial depth of about 0.05 m from the borehole. A shallow resistivity Ro is a resistivity measured or estimated within this shallow depth of investigation.

Generally, the formation evaluation modules (well logging instruments) 201, 203, 205, and 207 includes adaptations as may be necessary to provide for operation during drilling. In some embodiments, the adaptations may be realized for use after a drilling process has been performed. That is, it is not necessary that the teachings herein be employed strictly in a "while drilling" manner. Accordingly, wireline and other logging techniques may make use of aspects of the teachings herein after a drilling sequence has been completed. Thus, depending on the configuration, the modules 201, 203, 205, 207 may be used during drilling and/or after the wellbore 12 has been formed.

In accordance with embodiments of the present disclosure, HDIL full-spectrum multi-array induction logging module 205 provides formation resistivities at multiple radial depths of investigation. The combination of HDIL high vertical resolution and deep-investigating radial measurements with inversion processing allows for the analysis of the formation resistivity Rt, flushed (invaded) zone resistivity Rxo, and depth of invasion. Shallow resistivity logs (e.g., array laterolog, micro-resistivity) from a shallow resistivity module 207 enables study of the near-wellbore zone (e.g., up to about 0.05 m) providing an estimate of shallow resistivity Ro near the borehole wall. These tools may provide a reliable estimate for the invaded zone resistivity, Rxo, depending on the distance from the borehole.

Figure 3:
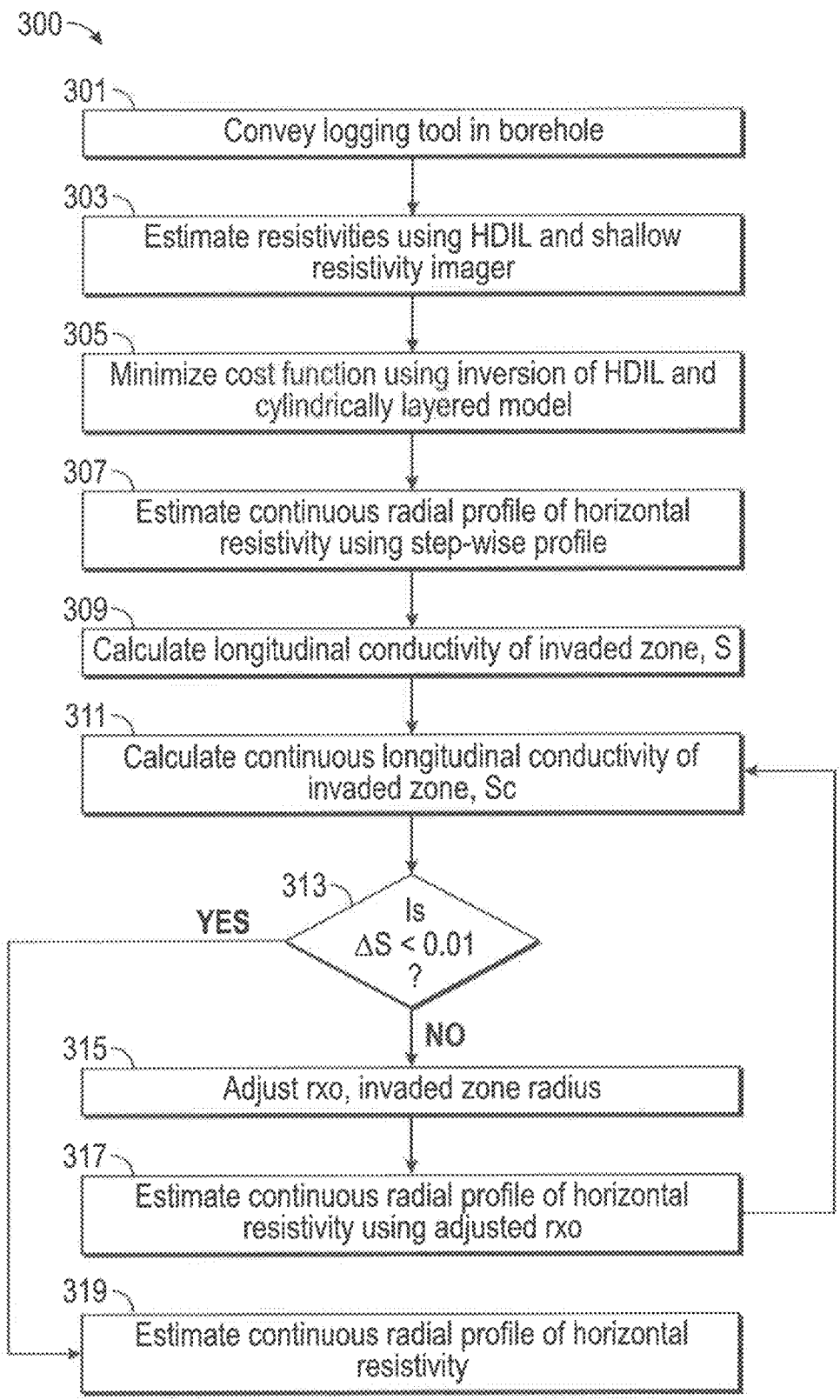
FIG. 3 shows a flow chart of a method for estimating a continuous radial profile of horizontal resistivity in the invaded zone in accordance with embodiments of the present disclosure.

FIG. 3 shows a flow chart of a method 300 for estimating a continuous radial profile of horizontal resistivity in the invaded zone. In step 301, logging tool 200 may be conveyed in a borehole intersecting formation 13. In step 303, array type induction logging module 205 and shallow resistivity module 207 may acquire information indicative of the horizontal resistivity $R_h$ and shallow resistivity Ro, respectively. In step 305, a step-wise radial profile of horizontal resistivity in invaded zone may be used as an initial guess for an inversion of the resistivity logs, invasion profile parameters (e.g., radius of invaded zone), and borehole parameters (e.g., radius of borehole). The step-wise profile of horizontal resistivity and invaded zone radius based on a cylindrically-layered earth model may be calculated using HDIL data to model the hydrodynamic evolution of the invaded zone. Inversion techniques that may be used include: (a) trial and error, (b) gradient optimization, and (c) simplex-based optimization. A minimized (cost) function for the inversion might be given by the expression:

$$F = \sqrt{\frac{1}{n} \sum_{i=1}^{n} \left( \frac{f_i^e - f_i^s}{\sigma_i} \right)^2} \qquad (1)$$

where n is the number of signals, $f_i^e$ is experimental data, $f_i^s$ is synthetic data, and $\sigma_i$ is the absolute noise (dispersion). Inversion is performed in consecutive order for one or more subzones (e.g., radial depths into the formation from the borehole wall) until the cost function satisfies a minimization constraint (e.g., F<1). Drilling mud resistivity Rm, borehole radius rb and formation resistivity Rt are assumed to be known (provided by drilling conditions and HDIL or 3DEX inversion). The radii of several subzones in invaded zone may be distributed evenly. The resistivities estimated from the inversion are drilling mud resistivity (Rm), horizontal resistivity of the invaded zone ($R_i$, i=1, ..., x−1), and horizontal resistivity of the uninvaded zone (Rt). The radial distances (radii) that may be used in the cylindrical model are the borehole radius (rb), the subzones of the invaded zone ($r_i$, i=1, ..., x−2, $r_{x-1}$=rxo, radius of the invaded zone radius), where x is the total number of subzones representing the invaded zone, and x+1 is the total number of cylindrical layers used to model the invasion profile (e.g., borehole layer, one or more subzones of the invaded zone, and undisturbed formation). Thus, the resistivity at $r_{x+1}$) estimates the resistivity of the undisturbed formation.

In step 307, a continuous profile of horizontal resistivity in invaded zone ($Rxo_h$) may be estimated using shallow resistivity Ro, subzone resistivities $R_i$, and formation resistivity, Rt. In some embodiments, a polynomial spline approximation of the step-wise profile may be used to estimate the continuous profile of horizontal resistivity. The nodes of the spline may be set as $t_1$=rb, $t_2$=$(r_b+r_1)/2$, $t_i(r_{i-2}+r_{i-1})/2$ (where i=3, ..., x), and $t_{x+1}$=rxo. Values of resistivity in the nodes may be $f_1(t_1)$=Ro, $f_i(t_i)$=$R_{i-1}$ (where i=2, ..., x; and j=2, ..., x), and $f_{x+1}(t_{x+1})=Rt$. Other methods may be used to estimate the continuous profile of horizontal resistivity, such as Gregory-Newton interpolation formula, Lagrange polynomials, or Newton's interpolation method.

In step 309, the longitudinal conductivity S of the invade zone may be calculated. This parameter may be stably determined by inductive methods using the multi-component induction logging information. Also, in step 311, a longitudinal conductivity $S^c$ may be calculated using the spline approximation of horizontal resistivity. In step 313, the difference between S and $S^c$ may be evaluated by a threshold. For example, if $\Delta S=(S-S^c)/S>$ about 0.01, then the invaded zone radius (rxo) may be adjusted (increased or decreased as needed) in step 315; the nodes may be distributed uniformly across this radius; and the splines may be recalculated in step 317. The longitudinal conductivity $S^c$ may be recalculated using the spline approximation of horizontal resistivity (step 311). Steps 311, 313, 315, and 317 may be repeated until $\Delta S$ is less than the threshold used to estimate the continuous radial profile of horizontal resistivity in step 319. In other embodiments, the difference between S and $S^c$ may be evaluated using another threshold, e.g., a threshold between about 0.49 and about 0.01.

Figure 4A:
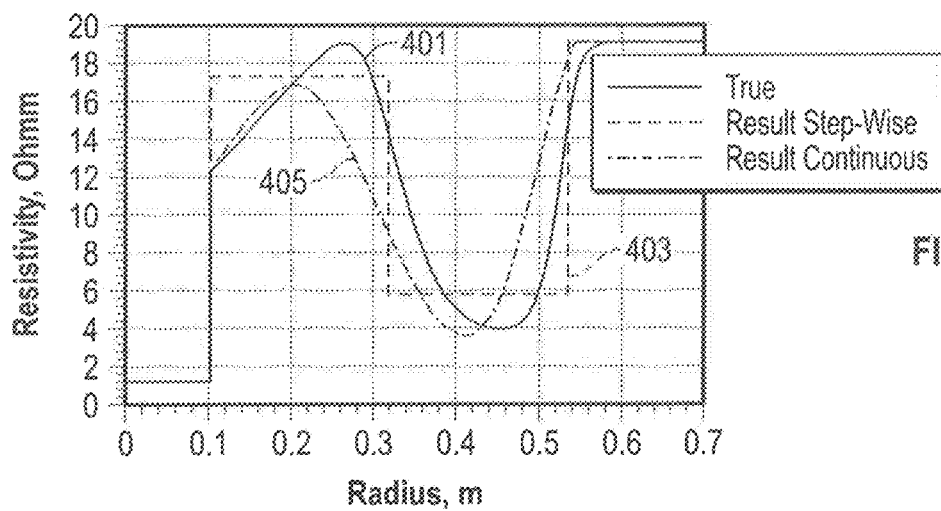
FIGS. 4A-4C shows charts of resistivity profiles versus radial distance for different types of drilling mud in accordance with embodiments of the present disclosure.
Figure 4B:
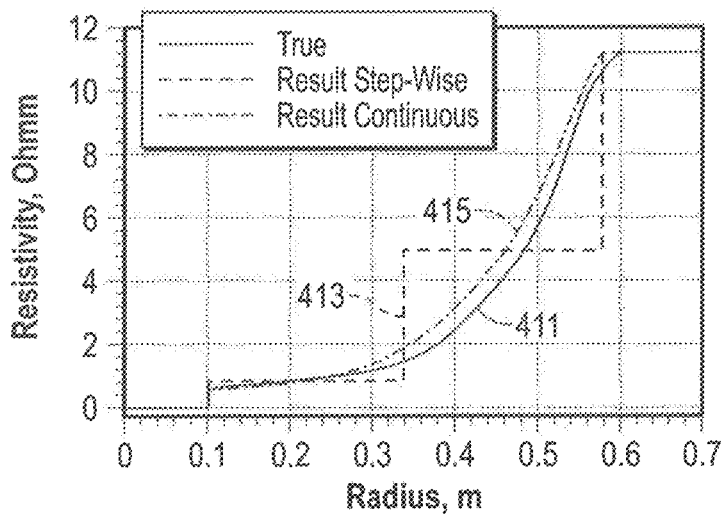
Figure 4C:
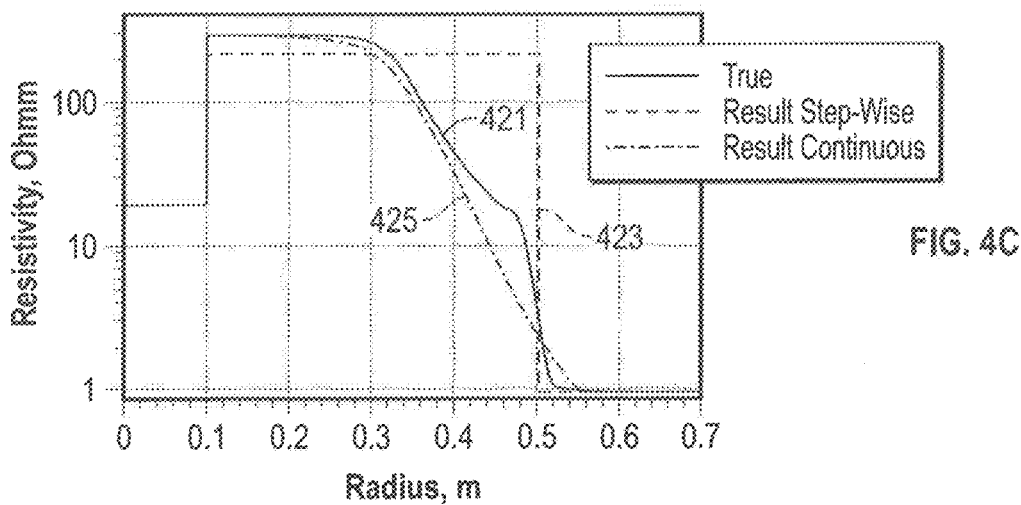

FIGS. 4A-4C illustrate simulated results of an inversion for different types of drilling mud to estimate a continuous radial profile of horizontal resistivity in accordance with embodiments of the present disclosure. Each chart depicts the horizontal resistivity profile versus radial distance from the borehole wall. True radial resistivity profiles were calculated using hydrodynamic modeling of the invasion profile. Pseudo-experimental HDIL data $\vec{f}^e$ was simulated for true resistivity profiles. Random noise with dispersion $0.01 \cdot f_i^e$ was added to this experimental data. Formulating an initial guess for the inversion was done taking into account the type of the drilling mud Rm, the shallow resistivity Ro, and the formation resistivity Rt values.

Referring to FIG. 4A, the case of fresh drilling mud was simulated to estimate the continuous radial profile of horizontal resistivity in the invaded zone. In this simulation, these formation parameters were used:

| SIMULATION 1 | |
|---|---|
| Parameter | Value |
| Rm | 1.2 Ohm · m |
| Ro | 12.3 Ohm · m |
| Rt | 19.1 Ohm · m |
| rb | 0.1 m |
| Rxo | 0.6 m | where Rm is the borehole resistivity; Ro is a shallow resistivity of the borehole wall; Rt is the resistivity of the uninvaded zone (i.e., earth formation); rb is the borehole radius; and rxo is the radius of the invaded zone. The true invaded zone longitudinal conductivity ($S^d$) was 0.054 S. A four-layered cylindrical model including two layers representing the borehole and undisturbed formation was used in inversion of HDIL data. In other words, the cylindrical model included two subzones for the invaded zone. The following parameters of invaded zone were estimated: $R_1$=17.2 Ohm·m, $R_2$=5.79 Ohm·m, $r_1$=0.317 m, $r_2$=rxo=0.535 m; S(r=0.6 m)=0.054 S. The cost function was minimized to 0.6 (i.e., F=0.6). The true resistivity profile is depicted as curve 401, the resulting cylindrically-layered model (step-wise profile) is depicted by curve 403, and the resulting continuous radial profile of horizontal resistivity is depicted by curve 405.

Referring to FIG. 4B, the case of salty drilling mud was simulated to estimate the continuous radial profile of horizontal resistivity in the invaded zone. In this simulation, these parameters were used:

| SIMULATION 2 | |
|---|---|
| Parameter | Value |
| Rm | 0.024 Ohm · m |
| Ro | 0.635 Ohm · m |
| Rt | 11.3 Ohm · m |
| rb | 0.1 m |
| Rxo | 0.6 m |

The true invaded zone longitudinal conductivity ($S^d$) was 0.324 S. A four-layered cylindrical model including borehole and formation was used in inversion of HDIL data. The following parameters of invaded zone were obtained: $R_1$=0.875 Ohm·m, $R_2$=5 Ohm·m, $r_1$=0.339 m, $r_2$=rxo=0.578 m; S(r=0.6 m)=0.323 S. The resulting value of cost function was 0.5 (F=0.5). The true resistivity profile is shown by curve 411, the resulting cylindrically-layered model (stepwise profile) is shown by curve 413, and the resulting continuous radial profile of horizontal resistivity is shown by curve 415.

Referring to FIG. 4C, the case of oil-based drilling mud was simulated to estimate the continuous radial profile of horizontal resistivity. In this simulation, these parameters were used:

| SIMULATION 3 | |
|---|---|
| Parameter | Value |
| Rm | 19.2 Ohm · m |
| Ro | 284 Ohm · m |
| Rt | 0.95 Ohm · m |
| rb | 0.1 m |
| Rxo | 0.6 m |

The true invaded zone longitudinal conductivity $S^d$ was 0.101 S. A three-layered cylindrical model including borehole and formation was used in inversion of HDIL data. In other words, a single subzone ($r_1$) represented the invaded zone. The following parameters of invaded zone were obtained: $R_1$=211 Ohm·m, $r_1$=rxo=0.505 m; S(r=0.6 m)=0.102 S. The cost function was minimized to 0.7 (i.e., F=0.7). The true resistivity profile is shown by curve 421, the resulting cylindrically-layered model (step-wise profile) is shown by curve 423, and the estimated continuous profile of horizontal resistivity is depicted by curve 425. FIGS. 4A-4C illustrate that the resulting invaded zone resistivity replicates true resistivity curve with a reliable accuracy. Visible discrepancy may be due to insufficient sensitivity of HDIL data to the near borehole zone.

Figure 5:
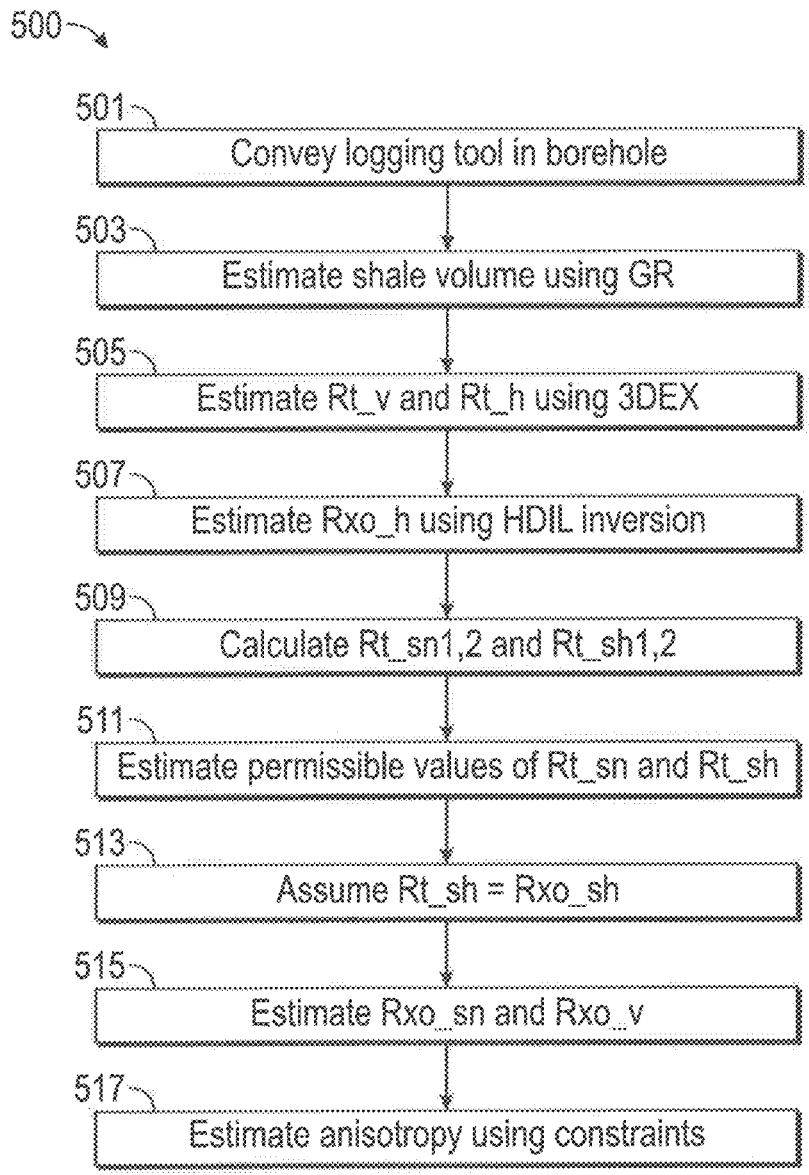
FIG. 5 shows a flow chart of a method for estimating a continuous radial profile of anisotropy in accordance with embodiments of the present disclosure.

FIG. 5 shows a flow chart of a method for estimating a continuous radial profile of anisotropy according to embodiments of this disclosure. In step 501, logging tool 200 may be conveyed in borehole 12 intersecting earth formation 13. The 3DeX multi-component induction logging module 203 reliably detects and measures resistivity anisotropy of thinly laminated sand/shale sequence, i.e., transverse isotropic rocks, in the undisturbed formation. The nuclear detection module 201 provides gamma gay (GR) log that measure the natural radioactivity of the formation being surveyed. The intensity of radiation indicates the rock type present along the wellbore; thus, module 201 may be configured to generate GR information estimating shale content (e.g., shale volume). A continuous radial profile of anisotropy in the invaded zone may be estimated using the radial profile of horizontal resistivity ($Rxo_h$) estimated from the HDIL inversion, shale volume estimated from the GR information, and horizontal and vertical resistivities obtained from an inversion for 3DEX information. In steps 503, 505, and 507, these parameters of interest may be estimated using formation evaluation modules 201, 203, 205.

The formulae below connect horizontal and vertical resistivities ($R_h$ and $R_v$) with the shale volume ($V_{sh}$) as well as sand and shale resistivities ($R_{sn}$ and $R_{sh}$):

$$R_h = \frac{1}{(1-V_{sh})/R_{sn} + V_{sh}/R_{sh}} \quad (2)$$

$$R_v = (1-V_{sh}) \cdot R_{sn} + V_{sh} \cdot R_{sh} \quad (3)$$

The anisotropy $\lambda$ is given by the expression $$\lambda = \frac{R_v}{R_h}.$$

Taking into account Eq. (2) and (3), anisotropy may be given by:

$$\lambda = 1 + V_{sh}(1-V_{sh})\left(\frac{R_{sn}}{R_{sh}} + \frac{R_{sh}}{R_{sn}} - 2\right) \quad (4)$$

Sand and shale resistivities ($R_{sn}$ and $R_{sh}$) may be determined for a given horizontal resistivity ($R_h$), anisotropy ($\lambda$), and shale volume ($V_{sh}$) from the system of equations (2), (4) in the following way:

$$x = \frac{R_{sn}}{R_{sh}} \quad (5)$$

From Eq. (4) the following equation for x may be derived:

$$x + \frac{1}{x} = 2q => x^2 - 2qx + 1 = 0 \quad (6)$$

where $$q = \frac{\lambda - 1}{2V_{sh}(1-V_{sh})} + 1 \quad (7)$$

and q>1.
Solving Eq. (6) gives:

$$x_{1,2} = q \pm \sqrt{q^2 - 1} \quad (8)$$

Using Eq. (2), the horizontal sand and shale resistivities are given by:

$$R_{sn_{1,2}} = R_h \cdot (1 - V_{sh} + V_{sh} \cdot x_{1,2}) \quad (9)$$

$$R_{sh_{1,2}} = R_h \cdot \frac{1 - V_{sh} + V_{sh} \cdot x_{1,2}}{x_{1,2}} \quad (10)$$

Thus, Eq. (9) and (10) may yield two solutions for the sand and shale resistivities. These resistivities may satisfy the next expression:

$$\frac{R_{sn_{1,2}}}{R_{sh_{1,2}}} = \frac{R_{sh_{2,1}}}{R_{sn_{2,1}}} \quad (11)$$

The anisotropy $\lambda$ may be determined for known horizontal resistivities ($R_h$), shale resistivities ($R_{sh}$), and shale volume ($V_{sh}$) according to the following expression:

$$\lambda = 1 + V_{sh}\frac{(y-1)^2}{y - V_{sh}} \quad (12)$$

where $$y = \frac{R_{sh}}{R_h} \quad (13)$$

In some embodiments, an inversion of 3DEX data may provide horizontal and vertical formation resistivities ($Rt_h$, and $Rt_v$); and the nuclear detection module may provide an initial estimate for shale volume ($V_{sh}$). In step 509, sand and shale resistivities in the uninvaded zone may be determined from Eq. (9) and (10). In step 511, the solutions for these resistivities may be chosen based on a permissible ratio between the sand resistivity and the shale resistivity. For example, a permissible ratio between the sand resistivity and the shale resistivity may be $$x = \frac{R_{sn}}{R_{sh}},$$

where x>1 or x<1. In step 513, it may be assumed that the shale resistivity in the invaded zone $Rxo_{sh}$ is the same as in the undisturbed zone due to the absence of permeability across this formation layer, i.e., $Rxo_{sh}=Rt_{sh}$. The shale resistivity may be denoted by $R_{sh}$. Resistivity of the sand in invaded zone $Rxo_{sn}$ changes depending on the radial distance from the borehole and the extent of invasion.

In step 515, the continuous radial profile of horizontal resistivity for sand may be estimated using Eq. (2) and the $Rxo_h$ derived from the inversion of HDIL and shallow resistivity data based on the step-wise profile (e.g., according to the steps of method 300 depicted in FIG. 3):

$$Rxo_{sn} = \frac{1 - V_{sh}}{1/Rxo_h - V_{sh}/R_{sh}} \quad (14)$$

Also in step 515, the continuous radial profile of vertical resistivity in the invaded zone ($Rxo_v$) may be estimated using Eq. (2):

$$Rxo_v = \frac{(1-V_{sh})^2}{1/Rxo_h - V_{sh}/R_{sh}} + V_{sh} \cdot R_{sh} \quad (15)$$

The vertical resistivity in the invaded zone may change depending on its distance from the borehole wall, and so may the horizontal resistivity in the invaded zone.

In step 517, the continuous radial profile of anisotropy may be estimated from Eq. (12) and (13):

$$\lambda = 1 + V_{sh} \frac{\left(\frac{R_{sh}}{Rxo_h} - 1\right)^2}{\frac{R_{sh}}{Rxo_h} - V_{sh}} \quad (16)$$

Also in step 517, an algorithm may be used to prevent high values of invaded zone resistivity during inversion (e.g., the inversion applied in method 300). Limits for varying $Rxo_h$ may be introduced. For simplification, the invaded zone indicator xo has been omitted from $R_h$. That is, $R_h$ refers to $Rxo_h$ in Eq. (20)-(23). Suppose a maximum anisotropy ($\lambda^{max}$) was introduced in Eq. (7) (i.e., $\lambda=\lambda^{max}$), which may be given by:

$$q = \frac{\lambda^{max} - 1}{2V_{sh}(1 - V_{sh})} + 1 \quad (17)$$

According to Eq. (5), the roots of Eq. (8) may produce two values of $R_n$ satisfying the condition $\lambda=\lambda^{max}$ (Recall $R_{sh}$ is assumed to be estimated from the formation resistivity $Rt_{sh}$):

$$R_{sn}^{max} = R_{sh}(q+\sqrt{q^2-1}) \geq R_{sh} \quad (18)$$

$$R_{sn}^{min} = R_{sh}(q-\sqrt{q^2-1}) \leq R_{sh} \quad (19)$$

Eq. (18) and (19) constitute two branches of inversion producing the same anisotropy. In case of Eq. (18), anisotropy changes from $\lambda=\lambda^{max}$ (at $R_{sn}=R_{sn}^{max}$) to $\lambda=1$ (at $R_{sn}=R_{sh}$). In other words, Eq. (18) restricts the high resistivity of the sand in this branch by introducing maximum resistivity within the allowed limits of anisotropy.

In case of Eq. (17), anisotropy changes from $\lambda=1$ (at $R_{sn}=R_{sh}$) to $\lambda=\lambda^{max}$ (at $R_{sn}=R_{sn}^{max}$). Thus Eq. (17) may restrict the low resistivity of the sand in this branch by introducing minimum resistivity within the allowed limits of anisotropy.

Consider the branch of inversion generated by Eq. (18). Combining Eq. (2) and (18), the following limits for $R_h$ are given:

$$R_{sh} \leq R_h \leq R_{sh}/(V_{sh}+(1-V_{sh})(q+\sqrt{q^2-1})) = R_h^{max\ \lambda} \quad (20)$$

Similarly, in case of Eq. (19), a minimum horizontal resistivity is given by:

$$R_h^{min\ \lambda} = R_{sh}/(V_{sh}+(1-V_{sh})(q-\sqrt{q^2-1})) \leq R_h \leq R_{sh} \quad (21)$$

Conditions (20) and (21) will never allow $\lambda$ to exceed $\lambda^{max}$ (maximum anisotropy). These conditions may be combined into one condition for horizontal resistivity in the invaded zone:

$$R_h^{min\ \lambda} \leq R_h \leq R_h^{max\ \lambda} \quad (22)$$

In addition, $R_h$ may be directly constrained by:

$$R_h^{min} \leq R_h \leq R_h^{max} \quad (23)$$

Values of $R_h^{min}$ and $R_h^{max}$ depend on the type of drilling mud and values of formation and borehole wall resistivities.

Shale volume estimate from gamma ray information is rather approximate or qualitative. Shale content may be influenced by radioactive sands, irradiation of the tool body, or other sources of radiation. In petrophysical assessments of $V_{sh}$, it is recommended to take the lowest value among possible. However, the continuous radial profiles of anisotropy and horizontal resistivity in the invaded zone may provide a technique to correct the shale volume estimate from gamma ray information.

A shallow resistivity imager and 3DeX tools recover reliable values of Ro, $Rt_h$ and $Rt_v$. Taking into account maximum permissible anisotropy $\lambda^{max}$, $V_{sh}$ may be checked for its reliability or accuracy and adjusted accordingly. The formation shale resistivity $R_{sh}$ (which is assumed to be the same in the invaded zone) may be calculated using Eq. (7), (8), and (10). The $R_h^{min\ \lambda}$ and $R_h^{max\ \lambda}$ may be calculated using Eq. (7), (20), and (21). Then, using Eq. (22), it may be checked whether $R_h^{max\ \lambda} \leq Ro \leq R_h^{max\ \lambda}$; $R_h^{min\ \lambda} \leq Rt_h \leq R_h^{max\ \lambda}$; or both are satisfied. In other embodiments, it may be checked whether at least one of (a) an estimated horizontal resistivity of the borehole wall (Ro) and (b) an estimated horizontal resistivity of the earth formation ($Rt_h$) is not between about a minimum horizontal resistivity ($R_h^{min\ \lambda}$) and about a maximum horizontal resistivity ($R_h^{max\ \lambda}$). If the conditions are not satisfied or if the solutions are outside a permissible range of shale and sand resistivities (e.g., the permissible ratio discussed in step 511 of FIG. 5), then the shale volume may be corrected by adjusting the value of the shale volume (i.e., increasing or decreasing it).

These checks guarantee the reliability and compatibility of the mixed data used to estimate the continuous radial profile of anisotropy in the invaded zone. As an example, $R_h^{min}$ and $R_h^{max}$ (Eq. (23)) may be used to check the reliability of the shale volume instead of using Eq. (22) based on Ro and $Rt_h$, if the direct constraints on the invaded zone resistivity are selected with confidence. This may occur if a reliable initial guess for the invaded zone resistivity is calculated. These checks may be repeated using the corrected shale volume. That is, the anisotropy may be recalculated using this corrected shale volume; and then Ro, $Rt_h$, and $Rxo_h$ may be checked against the recalculated minima and maxima of their corresponding constraints. The shale volume may be adjusted until one or more of these resistivity constraints are satisfied.

FIGS. 6A-9C illustrate the inversion results for estimating the continuous radial profile of horizontal resistivity, estimating the continuous radial profile of anisotropy, and correcting gamma ray estimates of shale volume, under various sand-shale conditions. These results were calculated using the following data obtained at a Beta test site in Oklahoma: borehole diameter caliper curve; mud resistivity curve extrapolated using a measurement of Rm at the surface and downhole temperature; HDIL apparent conductivities; formation horizontal and vertical resistivities from 3DEX inversion; shallow resistivity Ro estimated from imager information; and shale volume curve estimated from the gamma ray (GR) information.

At this test site, there were several salt-water sands invaded with fresh mud filtrate along the borehole. At each depth, inversion was done using a four-layered cylindrical model including borehole and formation; resistivities of two layers in the invaded zone and the invaded zone radius were estimated. Mean-square difference between experimental and synthetic HDIL data was mainly about 4%. Results of processing HDIL logs and complimentary data are presented over four vertical intervals along the borehole of the test well.

FIGS. 6A-6C illustrate the results of inversion of the nuclear and resistivity investigation data for the first interval comprising substantially a shale section in accordance with embodiments of the present disclosure. Along this interval, the drilling mud resistivity Rm was about 1.4 to about 1.5 Ohm m; and the borehole radius (rb) was about 0.11 m.

FIG. 6A shows a contour plot of the continuous radial profile of horizontal resistivity from a vertical depth of about 800 meters to about 1000 meters. This figure depicts the results of inversion of HDIL data based on a step-wise profile using a cylindrically layered model. Most of this interval has a formation horizontal resistivity ($Rt_h$) between about 4 to 7 Ohm m. At depths about 875 m and 935 m, this horizontal resistivity grows to about 9 to 10 Ohm m. At depths about 951 m, this horizontal resistivity reaches about 18 Ohm m. The behavior of the borehole wall resistivity is similar to the formation resistivity. Growth of the resistivity near the borehole wall can be observed. A maximal invaded zone horizontal resistivity of about 15 Ohm m can be observed at about depth 855 m to 860 m.

FIG. 6B shows a contour plot of the continuous radial profile of anisotropy along the same vertical interval as FIG. 6A. Formation anisotropy is substantially about 2 to 3. At depths about 888 m to 900 m, anisotropy increases to about 4 to 4.7. At depths about 937 m to 940 m, anisotropy reaches about 6.6.

FIG. 6C shows a graph of the relative shale volume along the same vertical interval as FIG. 6A. Curve 601 represents the shale volume estimated by the gamma ray information; and curve 603 represents the corrected shale volume in accordance with embodiments of this disclosure. Along this vertical interval, corrections of the shale volume derived from gamma ray information are small.

FIGS. 7A-7C illustrate the results of inversion of the nuclear and resistivity investigation data for the second interval comprising substantially a sand section in accordance with embodiments of the present disclosure. Along this interval, the drilling mud resistivity Rm was about 1.4 Ohm m; and the borehole radius (rb) was between about 0.099 m to about 0.11 m.

FIG. 7A shows a contour plot of the continuous radial profile of horizontal resistivities from a vertical depth of about 1040 meters to about 1120 meters. This figure depicts the results of inversion of HDIL data based on the step-wise profile using the cylindrically layered model. This figures show that the formation horizontal resistivity ($Rt_h$) is about 1.7 to 8 Ohm·m. The resistivity near the borehole wall is increased about 2 to 3 times more than the first interval. When moving away from the borehole, the resistivity firstly increases and then decreases down to formation resistivity, i.e., uninvaded zone. The invaded zone resistivity is substantially higher as compared with the shale section in the first interval. Maximum horizontal resistivity is about 58 Ohm m at a depth about 1104 m.

FIG. 7B shows a contour plot of the continuous radial profile of anisotropy along the same vertical interval as FIG. 7A in accordance with embodiments of this disclosure. Similar to the horizontal resistivity, the anisotropy firstly grows in radial direction and then decreases to formation anisotropy.

FIG. 7C shows a graph of the relative shale volume along the same vertical interval as FIG. 7A in accordance with embodiments of this disclosure. Curve 701 represents the shale volume estimated by the gamma ray information; and curve 703 represents the corrected shale volume in accordance with embodiments of this disclosure. Along this vertical interval, substantial corrections of the shale volume derived from gamma ray information were made at intervals 1041 to 1047 m in accordance with embodiments of this disclosure.

FIGS. 8A-8C illustrate the results of inversion of the nuclear and resistivity investigation data for the third interval comprising substantially another sand section in accordance with embodiments of the present disclosure. Along this interval, the drilling mud resistivity (Rm) was about 1.3 Ohm m; and the borehole radius (rb) was about 0.1 m.

FIG. 8A shows a contour plot of the continuous radial profile of horizontal resistivities from a vertical depth of about 1610 meters to about 1710 meters. This figure depicts the results of inversion of HDIL data based on the step-wise profile using the cylindrically layered model. The horizontal resistivity of the uninvaded zone is between about 1.8 Ohm m to about 3.7 Ohm m. The resistivity near the borehole wall is much higher, up to 10 times higher than the second interval. The invaded zone horizontal resistivity increases in the radial direction and then decreases to formation resistivity. Maximum resistivity is about 220 Ohm m at depth 1657 m.

FIG. 8B shows a contour plot of the continuous radial profile of anisotropy along the same vertical interval as FIG. 8A in accordance with embodiments of this disclosure. Generally, anisotropy is low across this interval. A high anisotropy is observed in the upper part of the section. Similar to horizontal resistivity, the anisotropy firstly increases in radial direction and then decreases to a formation anisotropy value.

FIG. 8C shows a graph of the relative shale volume along the same vertical interval as FIG. 8A in accordance with embodiments of this disclosure. Curve 801 represents the shale volume estimated by the gamma ray information; and curve 803 represents the corrected shale volume in accordance with embodiments of this disclosure. Along this vertical interval, some substantial corrections of the shale volume derived from gamma ray information were made at intervals at short intervals where original shale volume was locally high in accordance with embodiments of this disclosure.

FIGS. 9A-9C illustrate the results of inversion of the nuclear and resistivity investigation data for the forth interval comprising a laminated sand-shale section in accordance with embodiments of the present disclosure. Along this interval, the drilling mud resistivity (Rm) was about 1.2 Ohm m; and the borehole radius (rb) was about 0.11 m.

FIG. 9A shows a contour plot of the continuous radial profile of horizontal resistivities from a vertical depth of about 2400 meters to about 2500 meters. This figure depicts the results of inversion of HDIL data based on the step-wise profile using the cylindrically layered model. The uninvaded zone horizontal resistivity ($Rt_h$) varies between about 6 to 60 Ohm m. The resistivity near the borehole wall is much higher, up to 10 times. It is comparable with high values of the formation resistivity. Generally, the invaded zone resistivity firstly grows in radial direction and then decreases to the formation resistivity (undisturbed zone) value. The maximum resistivity is about 170 Ohm m at 2434 m.

FIG. 9B shows a contour plot of the continuous radial profile of anisotropy along the same vertical interval as FIG. 9A in accordance with embodiments of this disclosure. The formation anisotropy is in the range about 1 to about 6. Generally, anisotropy is high throughout this interval.

FIG. 9C shows a graph of the relative shale volume along the same vertical interval as FIG. 9A in accordance with embodiments of this disclosure. Curve 901 represents the shale volume estimated by the gamma ray information; and curve 903 represents the corrected shale volume in accordance with embodiments of this disclosure. Substantial corrections to the shale volume derived from gamma ray information were made at several depths along this interval in accordance with embodiments of this disclosure.

Figure 10:
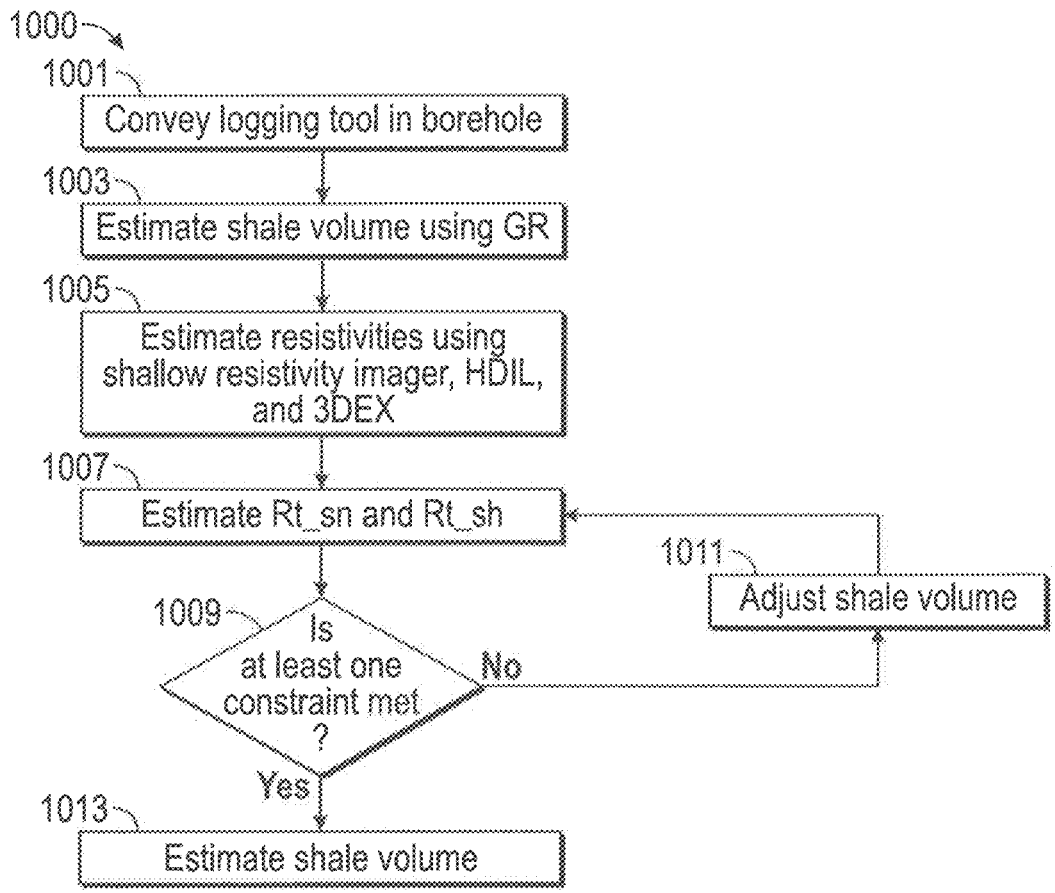
FIG. 10 shows a flow chart of a method for estimating at least one parameter of interest according to embodiments of the present disclosure.

FIG. 10 shows a method 1000 for correcting a shale volume obtained from the gamma ray information in accordance with embodiments of this disclosure. In step 1001, logging tool 200 may be conveyed to borehole 12 intersecting formation 13. In step 1003, nuclear detection module 201 may obtain gamma ray counts to estimate the shale volume of the formation. In step 1005, multi-component induction logging module 203, multi-array induction logging 205, and shallow resistivity module 207 may obtain resistivity information to estimate $R_h$, $Rt_v$, $Rt_h$, and Ro. In step 1007, the shale and the sand resistivities of the formation ($Rt_{sh}$, $Rt_{sn}$) may be estimated (e.g., according to at least step 509 of FIG. 5). In steps 1009 and 1011, as a non-limiting example, the shale volume may be corrected according to the constraints related to Ro or $Rt_h$. Using Eq. (22) or (23), it may be checked whether $R_h^{min\ \lambda} \leq Ro \leq R_h^{max\ \lambda}$; $R_h^{min\ \lambda} \leq Rt_h \leq R_h^{max\ \lambda}$; or both are satisfied. According to step 1009, if any of these conditions are satisfied or if the solutions are outside a permissible range of shale and sand resistivities (e.g., the permissible ratio discussed in step 511 of FIG. 5), then the shale volume may be corrected (step 1011) by adjusting the value of the shale volume (i.e., increased or decreased). Then, step 1007 may be repeated using this corrected shale volume to recalculate shale and sand restivities ($Rt_{sh}$, $Rt_{sn}$), until at least one of the constraints are satisfied to estimate the shale volume of the formation (step 1013).

Figure 11:
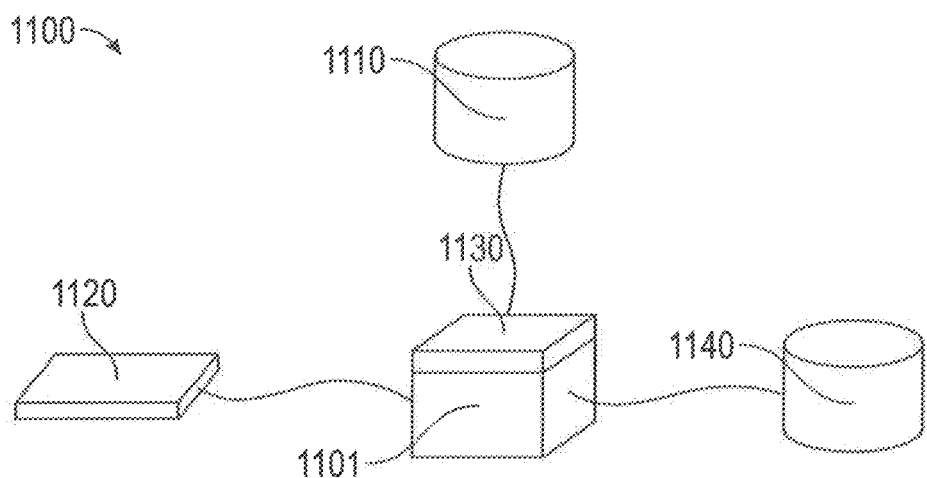
FIG. 11 shows a schematic of information processing system for implementing methods in accordance with embodiments of the present disclosure.

FIG. 11 shows an information processing system 1100, which may be implemented with a hardware environment that includes an information processor 1101, an information storage medium 1110, an input device 1120, processor memory 1130, and may include peripheral information storage medium 1140. The hardware environment may be in the well, at the rig, or at a remote location. Moreover, the several components of the hardware environment may be distributed among those locations. The input device 1120 may be any data reader or user input device, such as data card reader, keyboard, USB port, etc. The information storage medium 1110 stores information provided by the detectors. Information storage medium 1110 may include any non-transitory computer-readable medium for standard computer information storage, such as a USB drive, memory stick, hard disk, removable RAM, EPROMs, EAROMs, flash memories, optical disks, or other commonly used memory storage system known to one of ordinary skill in the art including Internet or network based storage. Information storage medium 1110 stores a program that when executed causes information processor 1101 to execute the disclosed methods. Information storage medium 1110 may also store the formation information provided by the user, or the formation information may be stored in a peripheral information storage medium 1140, which may be any standard computer information storage device, such as a USB drive, memory stick, hard disk, removable RAM, or other commonly used memory storage system known to one of ordinary skill in the art including Internet or network based storage. Information processor 1101 may be any form of computer or mathematical processing hardware, including Internet or network based hardware. When the program is loaded from information storage medium 1110 into processor memory 1130 (e.g. computer RAM), the program, when executed, causes information processor 1101 to retrieve sensor information from either information storage medium 1110 or peripheral information storage medium 1140 and process the information to estimate a parameter of interest. Information processor 1101 may be located on the surface or downhole (e.g., downhole tool 200, or modules 201, 203, 205, 207). Also, methods 300, 500, 1000 may be implemented using information processing system 1100.

Implicit in the processing of the data is the use of a computer program implemented on a suitable non-transitory machine-readable medium (non-transitory computer-readable medium) that enables the processor to perform the control and processing. The term processor as used in this application is intended to include such devices as field programmable gate arrays (FPGAs). The non-transitory machine-readable medium may include ROMs, EPROMs, EAROMs, Flash Memories, and Optical disks. As noted above, the processing may be done downhole or at the surface, by using one or more processors. In addition, results of the processing, such as an parameters indicative of a resistivity property, anisotropy, or shale volume, can be stored on a suitable medium.

As used herein, by "continuous radial profile" it is meant that a profile of a parameter of interest may be modeled by a continuous function with respect to a radial depth, i.e., depth of investigation. A continuous function, as used herein, refers to a function $f(x)$ in a single variable x, wherein the function is said to be continuous at point $x_0$ if: (1) $f(x_0)$ is defined so that $x_0$ is in the domain off; (2) $\lim_{x \to x_0} f(x)$ exists for x in the domain off, and (3) $\lim_{x \to x_0} f(x) = f(x_0)$ (i.e., the limit of $f(x)$ as x approaches $x_0$ equals $f(x_0)$). This is in contrast with a "step-wise radial profile," which refers to modeling a profile of a parameter of interest at discrete radial intervals or depths, i.e., a profile of a parameter of interest that is modeled at discrete radial intervals or depths.

By "invasion profile" it is meant the extent to which a mud filtrate has entered a permeable formation. An invasion profile may be assessed by estimating parameters involving the invasion profile, such as invaded zone radius, invaded zone resistivity, invaded zone anisotropy, undisturbed formation resistivity, permeability, porosity, water saturation, shale volume, etc. By "invaded zone" this disclosure refers to a volume of permeable formation where mud filtrate has displaced some or all of the moveable fluids in the permeable formation. The term "uninvaded zone", as used herein, refers to a volume of formation where mud filtrate has not displaced some or all of the moveable fluids in the formation. Invaded zone resistivity may indicated by Rxo. For purposes of this disclosure, uninvaded zone may also be referred to as undisturbed zone, virgin formation, or formation. Uninvaded zone resistivity may be indicated by Rt.

The term "thinly laminated layers" refers to narrow beds of formation, forming a distribution of thin plates, sheets, veins, or layers each having a thickness up to about 10 m. As described herein, "hydrodynamic evolution" refers to a fluid flow invasion of a mud filtrate displacing a moveable fluid in a permeable formation. As described herein, "hydrodynamic modeling" refers to modeling a fluid flow of a mud filtrate displacing a moveable fluid in a permeable formation. The term "permeable formation" refers to a formation having a permeability that allows an appreciable amount of fluid to flow through the formation. The term "impermeable formation" refers to a formation having a permeability lower by at least one order of magnitude than the permeable formation.

As described herein, the term "shallow resistivity" refers to a resistivity estimated or measured within a shallow depth of investigation. As described herein, a shallow depth of investigation is within an annulus around the borehole wall having a radial depth of about 0.05 m from the borehole, i.e. the outer boundary of the annulus is about 0.05 m from the borehole wall. Shallow resistivity may be indicated by Ro.

As described herein, "drilling fluid" or "drilling mud" refers to a fluid or mixture of fluids and solids used in drilling operations. Drilling mud or mud resistivity may be indicated by Rm.

Multi-component induction logging information, as used herein, includes information involving a multi-component logging module 203 that is indicative a parameter of interest of the earth formation. Shallow resistivity logging information, as used herein, includes information involving a shallow resistivity module 207 that is indicative of a parameter of interest of the earth formation. Gamma ray information, as used herein, includes information involving a nuclear detection module 201 that is indicative of a parameter of interest of the earth formation. A parameter of interest of the earth formation may include at least one of resistivity, conductivity, shale volume, or anisotropy. The term "pad", as used herein, refers to that part of a logging tool that is pressed firmly against the borehole wall and holds sensors (e.g., measure electrode or guard electrode) to measure a parameter of interest of the earth formation. The pad may be extended from the tool body on an arm or may be incorporated into the tool body.

As described herein, assumptions have been employed to estimate the resistivity of shale in the invaded zone as the same resistivity in the undisturbed zone. This assumes that the shale is impermeable. As used herein, shale may refer to an impermeable formation; and sand or sandstone may refer to a permeable formation. For the purpose of this disclosure vertical refers to the direction along the axis of the borehole (i.e., longitudinal axis of the borehole); and horizontal refers to a plane perpendicular to this vertical axis. Radial refers to a radial axis perpendicular to the longitudinal axis of the borehole.

The estimated parameter of interest may be stored (recorded) as information or visually depicted on a display. Aspects of the present disclosure relate to modeling a volume of an earth formation using the estimated parameter of interest, such as, for example, by associating estimated parameter values with portions of the volume of interest to which they correspond. The model of the earth formation generated and maintained in aspects of the disclosure may be implemented as a representation of the earth formation and stored as information. The information (e.g., data) may be stored on a non-transitory machine-readable medium, and rendered (e.g., visually depicted) on a display.

The method may include conducting further operations in the earth formation in dependence upon the estimated parameter of interest or upon models created using the estimated parameter of interest. Further operations may include at least one of: i) extending the borehole; ii) drilling additional boreholes in the formation; iii) performing additional measurements on the formation; iv) estimating additional parameters of the formation; v) installing equipment in the borehole; vi) evaluating the formation; vi) optimizing present or future development in the formation or in a similar formation; optimizing present or future exploration in the formation or in a similar formation; vi) evaluating the formation; and vii) producing one or more hydrocarbons from the formation.

Control of components of apparatus and systems described herein may be carried out using one or more models as described above. For example, at least one processor may be configured to modify operations i) autonomously upon triggering conditions, ii) in response to operator commands, or iii) combinations of these. Such modifications may include changing drilling parameters, steering the drillbit (e.g., geosteering), changing a mud program, optimizing measurements, and so on. Control of these devices, and of the various processes of the drilling system generally, may be carried out in a completely automated fashion or through interaction with personnel via notifications, graphical representations, user interfaces and the like. Reference information accessible to the processor may also be used.

While the foregoing disclosure is directed to specific embodiments of the disclosure, various modifications will be apparent to those skilled in the art. It is intended that all variations be embraced by the foregoing disclosure.

The invention claimed is:

1. A method of estimating a parameter of interest of an earth formation, comprising:
   estimating a continuous radial profile of anisotropy of an invaded zone of the earth formation using an estimated continuous radial profile of horizontal resistivity in the invaded zone, an estimated shale volume, and an estimated continuous radial profile of vertical resistivity in the invaded zone; and
   using at least one processor to estimate the parameter of interest by using the estimated continuous radial profile of anisotropy of the invaded zone of the earth formation.

2. The method of claim 1, wherein the continuous radial profile of horizontal resistivity in the invaded zone is estimated by modeling a hydrodynamic evolution of the invaded zone using:
   (a) a step-wise radial profile of horizontal resistivity in the invaded zone as an initial estimate of horizontal resistivity in the invaded zone;
   (b) an estimated shallow resistivity at a borehole wall; and
   (c) an estimated longitudinal conductivity of the formation at an outer boundary from the borehole wall estimated using multi-component induction logging information.

3. The method of claim 2, wherein:
   the estimated shale volume is estimated using gamma ray information;
   the shallow resistivity at the borehole wall is estimated using shallow resistivity logging information;
   the estimated vertical resistivity is estimated using multi-component induction logging information;
   the continuous radial profile of anisotropy is further estimated using an estimated resistivity of shale; and
   the estimated resistivity of shale is estimated using multi-component induction logging information and the estimated shale volume.

4. The method of claim 2, wherein the step-wise radial profile of horizontal resistivity is estimated using an inversion of induction logging information based on a cylindrical model of the earth formation.

5. The method of claim 1, wherein the earth formation includes thinly laminated layers.

6. The method of claim 1, wherein the continuous radial profile of vertical resistivity is estimated by an expression given by:

$$Rxo_v = \frac{(1-V_{sh})^2}{1/Rxo_h - V_{sh}/R_{sh}} + V_{sh} \cdot R_{sh}$$

where $Rxo_v$ is the vertical resistivity profile in the invaded zone, $V_{sh}$ is the estimated shale volume, $R_{sh}$ is a resistivity of shale, $Rxo_h$ is the continuous radial profile of horizontal resistivity in the invaded zone estimated using a step-wise radial profile of horizontal resistivity and hydrodynamic modeling.

7. The method of claim 1, wherein the continuous radial profile of anisotropy is estimated by an expression given by:

$$\lambda = \frac{R_v}{R_h}$$

where λ is the anisotropy profile, $R_v$ is a vertical resistivity of the invaded zone estimated using the continuous radial profile of vertical resistivity, and $R_h$ is the continuous radial profile of horizontal resistivity estimated using a step-wise radial profile of horizontal resistivity and hydrodynamic modeling.

8. The method of claim 1, wherein the parameter of interest includes a value of shale volume of the earth formation.

9. The method of claim 1, wherein the parameter of interest includes shale volume of the earth formation, and further comprising:
estimating a shale resistivity;
estimating a minimum horizontal resistivity and a maximum horizontal resistivity using the estimated anisotropy; and
correcting the estimated shale volume if at least one of (a) an estimated horizontal resistivity of the borehole wall and (b) an estimated horizontal resistivity of the earth formation is not between about the minimum horizontal resistivity and about the maximum horizontal resistivity.

10. An apparatus for estimating a parameter of interest of an earth formation, comprising:
an instrument disposed on a carrier, wherein the instrument comprises:
a radiation source;
a first gamma ray detector;
at least one second gamma ray detector;
at least one transmitter configured to apply electromagnetic signals to the earth formation;
at least one receiver configured to be responsive to the electromagnetic signals applied to the earth formation by the at least one transmitter; and
at least one processor configured to:
estimate a continuous radial profile anisotropy of an invaded zone of the earth formation using an estimated continuous radial profile of horizontal resistivity in the invaded zone, an estimated shale volume, and an estimated continuous radial profile of vertical resistivity in the invaded zone; and
estimate the parameter of interest by using the estimated anisotropy of the invaded zone of the earth formation.

11. The apparatus of claim 10, wherein the continuous radial profile of horizontal resistivity in the invaded zone is estimated by modeling a hydrodynamic evolution of the invaded zone using:
(a) a step-wise radial profile of horizontal resistivity in the invaded zone as an initial estimate of horizontal resistivity in the invaded zone;
(b) an estimated shallow resistivity at a borehole wall; and
(c) an estimated longitudinal conductivity of the formation at an outer boundary from the borehole wall estimated using multi-component induction logging information.

12. The apparatus of claim 11, wherein:
the estimated shale volume is estimated using gamma ray information;
the shallow resistivity at the borehole wall is estimated using shallow resistivity logging information;
the estimated vertical resistivity is estimated using multi-component induction logging information;
the continuous radial profile of anisotropy is further estimated using an estimated resistivity of shale; and
the estimated resistivity of shale is estimated using multi-component induction logging information and the estimated shale volume.

13. The apparatus of claim 11, wherein the step-wise radial profile of horizontal resistivity is estimated using an inversion of induction logging information based on a cylindrical model of the earth formation.

14. The apparatus of claim 10, wherein the earth formation includes thinly laminated layers.

15. The apparatus of claim 10, wherein the continuous radial profile of vertical resistivity is estimated by an expression given by:

$$Rxo_v = \frac{(1 - V_{sh})^2}{1/Rxo_h - V_{sh}/R_{sh}} + V_{sh} \cdot R_{sh}$$

where $Rxo_v$ is the vertical resistivity profile in the invaded zone, $V_{sh}$ is the estimated shale volume, $R_{sh}$ is a resistivity of shale, $Rxo_h$ is the continuous radial profile of horizontal resistivity in the invaded zone estimated using a step-wise radial profile of horizontal resistivity and hydrodynamic modeling.

16. The apparatus of claim 10, wherein the parameter of interest includes a value of shale volume of the earth formation.

17. The apparatus of claim 10, wherein the parameter of interest includes shale volume of the earth formation, and further comprising:
estimating a shale resistivity;
estimating a minimum horizontal resistivity and a maximum horizontal resistivity using the estimated anisotropy; and
correcting the estimated shale volume if at least one of (a) an estimated horizontal resistivity of the borehole wall and (b) an estimated horizontal resistivity of the earth formation is not between about the minimum horizontal resistivity and about the maximum horizontal resistivity.

18. A non-transitory computer-readable medium product having stored thereon instructions that, when read by at least one processor, causes the at least one processor to execute a method of estimating a parameter of interest of an earth formation comprising thinly laminated layers, the method comprising:
estimating a continuous radial profile anisotropy of an invaded zone of the earth formation using an estimated continuous radial profile of horizontal resistivity in the invaded zone, an estimated shale volume, and an estimated continuous radial profile of vertical resistivity in the invaded zone; and
using at least one processor to estimate the parameter of interest by using the estimated anisotropy of the invaded zone of the earth formation.

19. The non-transitory computer-readable medium product of claim 18, further comprising at least one of: (i) a ROM, (ii) an EPROM, (iii) an EEPROM, (iv) a flash memory, and (v) an optical disk.

\* \* \* \* \*